US009037763B2

(12) United States Patent
Huang et al.

(10) Patent No.: US 9,037,763 B2
(45) Date of Patent: May 19, 2015

(54) TRANSPORT MODE FOR A MEDIA AGNOSTIC USB PROTOCOL USING A WIRELESS SERIAL BUS (WSB) SESSION OF A WSB SERVICE

(71) Applicant: QUALCOMM Incorporated, San Diego, CA (US)

(72) Inventors: Xiaolong Huang, San Jose, CA (US); Shivraj Singh Sandhu, Milpitas, CA (US); Andrew Mackinnon Davidson, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/271,221

(22) Filed: May 6, 2014

(65) Prior Publication Data

US 2014/0337544 A1 Nov. 13, 2014

Related U.S. Application Data

(60) Provisional application No. 61/821,075, filed on May 8, 2013.

(51) Int. Cl.
G06F 13/38 (2006.01)
H04W 88/00 (2009.01)
H04W 80/00 (2009.01)

(52) U.S. Cl.
CPC .................................. *G06F 13/385* (2013.01)

(58) Field of Classification Search
USPC ............. 710/8–10, 62–64; 709/230; 455/41.2
See application file for complete search history.

(56) References Cited

U.S. PATENT DOCUMENTS

| 8,081,926 | B2* | 12/2011 | Hansen et al. | 455/41.2 |
| 8,370,651 | B2* | 2/2013 | Swaminathan | 713/300 |
| 8,489,024 | B1* | 7/2013 | Yucek et al. | 455/41.2 |
| 8,805,277 | B2* | 8/2014 | Ibrahim et al. | 455/41.2 |
| 8,832,328 | B2* | 9/2014 | Raveendran et al. | 710/8 |
| 2006/0045117 | A1* | 3/2006 | Qi et al. | 370/445 |
| 2010/0130138 | A1* | 5/2010 | Nandagopalan et al. | 455/69 |
| 2011/0097999 | A1* | 4/2011 | Hansen et al. | 455/41.2 |

(Continued)

OTHER PUBLICATIONS

Wireless Universal Serial Bus Specification, 1.1 Revision HP, Intel, LSI, Microsoft, Samsung, ST-Ericsson, Oct. 9, 2010, entire document, pp. 1-325.*

(Continued)

*Primary Examiner* — Tammara Peyton
(74) *Attorney, Agent, or Firm* — Shumaker & Sieffert, P.A.

(57) ABSTRACT

Techniques are described for establishing a Wireless Serial Bus (WSB) service to transport data using a Media Agnostic Universal Serial Bus (MAUSB) protocol according to a selected transport mode in a WSB session of the WSB service. The MAUSB protocol may be deployed either over an Internet Protocol (IP) stack or directly over a Media Access Control (MAC) layer. According to the techniques, the wireless service advertiser and the wireless service seeker negotiate the transport mode for the MAUSB protocol in each WSB session of the WSB service. During a service discovery process, the wireless service advertiser identifies one or more supported transport modes for the MAUSB protocol in service information for the WSB service. During a P2P connection setup and a WSB session setup, the wireless service seeker indicates a selected one of the supported transport modes for the MAUSB protocol in session information for the WSB session.

34 Claims, 8 Drawing Sheets

(56) References Cited

U.S. PATENT DOCUMENTS

2014/0143436 A1* 5/2014 Sadeghi et al. ............... 709/230
2014/0233556 A1* 8/2014 Li et al. ..................... 370/350

OTHER PUBLICATIONS

"USB-IF Completes Media Agnostic USB Specification," Mar. 18, 2014, http://www.businesswire.com/news/home/20140318006142/en/USB-IF-Completes-Media-Agnostic-USB-Specification#.VEBkNvIdVUw.*

"USB-IF Working on New Wireless USB Spec," Sep. 11, 2013, http://www.tomshardware.com/news/usb-if-wi-fi-media-agnostic-ma-use-spec,24200.html.*

WiGig MAC and PHY Specification, Version 1.1, Apr. 2011, entire document, pp. 1-442.*

Wi-Fi Peer-to-Peer (P2P) Techincal Specification, version 1.2, 2010, entire document pp. 1-160.*

"USB-IF to Develop Media Agnostic USB Specification," Tech Bulletin, Sep. 9, 2013, http://www.usb.org/press/USB-IF_Press_Releases/USB_WSE_Tech_Bulletin_FINAL.pdf.*

Media Agnostic Universal Serial Bus Specification, Release 1.0, Feb. 25, 2014, pp. 1-173, www.usg.org.*

International Search Report and Written Opinion from International Application No. PCT/US2014/037149, dated Nov. 12, 2014, 8 pp.

* cited by examiner

TRANSPORT MODE FOR A MEDIA AGNOSTIC USB PROTOCOL USING A WIRELESS SERIAL BUS (WSB) SESSION OF A WSB SERVICE

This disclosure claims the benefit of U.S. Provisional Application No. 61/821,075 filed May 8, 2013, the entire contents of which are incorporated by reference herein.

TECHNICAL FIELD

This disclosure relates to wireless communication techniques.

BACKGROUND

Mobile devices may take the form of mobile telephones, tablet computers, laptop computers, portable computers with wireless communication cards, personal digital assistants (PDAs), digital cameras, video gaming devices, portable media players, flash memory devices with wireless communication capabilities, wireless communication devices including so-called "smart" phones and "smart" pads or tablets, e-readers, or other of a wide variety of other types of portable devices. Mobile devices are becoming increasingly powerful with the addition of high-power processors, the capability to process media content, and the ability to interact with networks in the cloud. These improvements make it possible to develop new usage models for the mobile devices that provide a better user experience and improve productivity.

Recently, there has been a move to support wireless communication without the use of a wireless access point. The Wi-Fi Direct standard, currently under development by the Wi-Fi Alliance, is one standard that supports communication between two or more devices without the need for a wireless access point. Wi-Fi Direct may also enable wireless devices to easily connect and communicate with each other over an encrypted wireless communication channel without the need for a complicated setup process. Devices that communicate over Wi-Fi Direct may offer and seek services, such as send service, play service, print service, display service, wireless docking service, and wireless serial bus (WSB) service (i.e., Universal Serial Bus (USB) over wireless service), so that one device may wirelessly use capabilities of another device. The Wi-Fi Alliance has been developing an Application Service Platform (ASP) that implements the common functions needed for devices to advertise, seek out and manage these services.

SUMMARY

The techniques of this disclosure generally relate to establishing a Wireless Serial Bus (WSB) service to transport data using a Media Agnostic Universal Serial Bus (MAUSB) protocol according to a selected transport mode in a WSB session of the WSB service. In order to establish the WSB service, a wireless service advertiser and a wireless service seeker perform service discovery, peer-to-peer (P2P) connection setup, and WSB session setup. Once the WSB service is established, the MAUSB protocol may be deployed either over an Internet Protocol (IP) stack or directly over a Media Access Control (MAC) layer to transport data for the WSB session over the P2P wireless connection.

According to the techniques of this disclosure, the wireless service advertiser and the wireless service seeker negotiate the transport mode for the MAUSB protocol in each WSB session of the WSB service. For example, during the service discovery process, the wireless service advertiser identifies one or more supported transport modes for the MAUSB protocol in service information. During the P2P connection setup and WSB session setup, the wireless service seeker indicates a selected one of the supported transport modes for the MAUSB protocol in session information for the WSB session.

In one example, this disclosure is directed to a method for establishing WSB service using a wireless service advertiser, the method comprising transmitting an advertisement for a WSB service offered by the wireless service advertiser, wherein the advertisement includes service information that identifies one or more transport modes for a MAUSB protocol supported by the wireless service advertiser, and wherein the supported transport modes include one or more of over an IP stack and directly over a MAC layer, receiving a request from a wireless service seeker for a WSB session of the WSB service offered by the wireless service advertiser, wherein the request includes session information that indicates a selected one of the supported transport modes for the MAUSB protocol in the WSB session, upon accepting the WSB session, establishing the WSB session of the WSB service over a wireless connection between the wireless service advertiser and the wireless service seeker, and transferring data over the wireless connection using the MAUSB protocol according to the selected one of the supported transport modes for the WSB session.

In another example, this disclosure is directed to an apparatus implementing a wireless service advertiser for establishing WSB service, the apparatus comprising a memory configured to store data, and one or more processors configured to transmit an advertisement for a WSB service offered by the wireless service advertiser, wherein the advertisement includes service information that identifies one or more transport modes for a MAUSB protocol supported by the wireless service advertiser, and wherein the supported transport modes include one or more of over an IP stack and directly over a MAC layer, receive a request from a wireless service seeker for a WSB session of the WSB service offered by the wireless service advertiser, wherein the request includes session information that indicates a selected one of the supported transport modes for the MAUSB protocol in the WSB session, upon accepting the WSB session, establish the WSB session of the WSB service over a wireless connection between the wireless service advertiser and the wireless service seeker, and transfer the data over the wireless connection using the MAUSB protocol according to the selected one of the supported transport modes for the WSB session.

In a further example, this disclosure is directed to an apparatus implementing a wireless service advertiser for establishing WSB service, the apparatus comprising means for transmitting an advertisement for a WSB service offered by the wireless service advertiser, wherein the advertisement includes service information that identifies one or more transport modes for a MAUSB protocol supported by the wireless service advertiser, and wherein the supported transport modes include one or more of over an IP stack and directly over a MAC layer, means for receiving a request from a wireless service seeker for a WSB session of the WSB service offered by the wireless service advertiser, wherein the request includes session information that indicates a selected one of the supported transport modes for the MAUSB protocol in the WSB session, upon accepting the WSB session, means for establishing the WSB session of the WSB service over a wireless connection between the wireless service advertiser and the wireless service seeker, and means for transferring data over the wireless connection using the MAUSB protocol according to the selected one of the supported transport modes for the WSB session.

In another example, this disclosure is directed to a non-transitory computer-readable medium storing instructions for establishing WSB service that when executed cause one or more processors to transmit an advertisement for a WSB service offered by a wireless service advertiser, wherein the advertisement includes service information that identifies one or more transport modes for a MAUSB protocol supported by the wireless service advertiser, and wherein the supported transport modes include one or more of over an IP stack and directly over a MAC layer, receive a request from a wireless service seeker for a WSB session of the WSB service offered by the wireless service advertiser, wherein the request includes session information that indicates a selected one of the supported transport modes for the MAUSB protocol in the WSB session, upon accepting the WSB session, establish the WSB session of the WSB service over a wireless connection between the wireless service advertiser and the wireless service seeker, and transfer data over the wireless connection using the MAUSB protocol according to the selected one of the supported transport modes for the WSB session.

In an additional example, this disclosure is directed to a method for establishing WSB service using a wireless service seeker, the method comprising discovering, with the wireless service seeker, an advertisement for a WSB service offered by a wireless service advertiser, wherein the advertisement includes service information that identifies one or more transport modes for a MAUSB protocol supported by the wireless service advertiser, and wherein the supported transport modes include one or more of over an IP stack or directly over a MAC layer, requesting, with the wireless service seeker, a WSB session of the WSB service offered by the wireless service advertiser, wherein the request includes session information that indicates a selected one of the supported transport modes for the MAUSB protocol in the WSB session, upon receiving acceptance of the WSB session from the wireless service advertiser, establishing the WSB session of the WSB service over a wireless connection between the wireless service seeker and the wireless service advertiser, and transferring data over the wireless connection using the MAUSB protocol according to the selected one of the supported transport modes for the WSB session.

In a further example, this disclosure is directed to an apparatus implementing a wireless service seeker for establishing WSB service, the apparatus comprising a memory configured to store data, and one or more processors configured to discover an advertisement for a WSB service offered by a wireless service advertiser, wherein the advertisement includes service information that identifies one or more transport modes for a MAUSB protocol supported by the wireless service advertiser, and wherein the supported transport modes include one or more of over an IP stack and directly over a MAC layer, request a WSB session of the WSB service offered by the wireless service advertiser, wherein the request includes session information that indicates a selected one of the supported transport modes for the MAUSB protocol in the WSB session, upon receiving acceptance of the WSB session from the wireless service advertiser, establish the WSB session of the WSB service over a wireless connection between the wireless service seeker and the wireless service advertiser, and transfer the data over the wireless connection using the MAUSB protocol according to the selected one of the supported transport modes for the WSB session.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
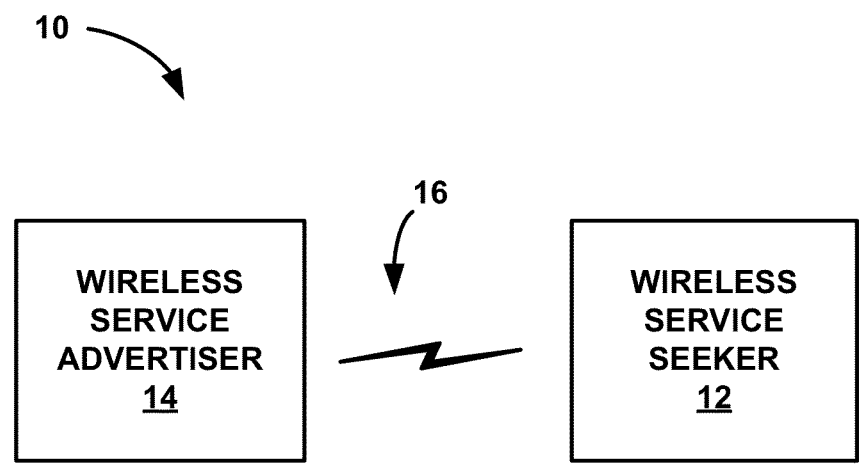
FIG. 1 is a block diagram illustrating a wireless network including a wireless service advertiser and a wireless service seeker transferring data over a wireless connection in accordance with the techniques of this disclosure.

FIG. 1 is a block diagram illustrating a wireless network 10 including a wireless service advertiser 14 and a wireless service seeker 12 transferring data over a wireless connection 16 in accordance with the techniques of this disclosure. Wireless service seeker 12 and wireless service advertiser 14 may each comprise a device with wireless communication capabilities. Examples include a mobile device such as a smartphone or other mobile handset, a tablet computer, a laptop computer, or another electronic device with wireless communication capabilities. In other examples, wireless service seeker 12 and advertiser 14 may each be components, such as a processor, a processing core, a chip, a chipset, or one or more other integrated circuits, of a larger device or system.

In some examples, each of wireless service seeker 12 and wireless service advertiser 14 may be implemented to include one or more microprocessors, digital signal processors (DSPs), application specific integrated circuits (ASICs), field programmable gate arrays (FPGAs), discrete logic, software, hardware, firmware or any combinations thereof. While not shown for purposes of clarity, each of wireless service seeker 12 and wireless service advertiser 14 may include a memory comprised of any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), magnetic random access memory (MRAM), FLASH memory, and the like. In some examples, each of wireless service seeker 12 and wireless service advertiser 14 may comprise a computer-readable storage medium for storing audio data, video data, as well as other kinds of data. Each of wireless service seeker 12 and wireless service advertiser 14 may also include a transmitter/receiver unit that includes include various mixers, filters, amplifiers and other components designed for signal modulation, as well as one or more antennas and other components designed for transmitting and receiving data.

In some examples, wireless service seeker 12 may establish communication with wireless service advertiser 14 automatically once wireless service seeker 12 and wireless service advertiser 14 come within operative communication range of each other, or manually in response to a user input. Wireless connection 16 may be a wireless channel capable of propagating wireless communication signals between wireless service seeker 12 and wireless service advertiser 14. In some examples, wireless connection 16 may be established based on radio frequency communications in frequency bands such as the 2.4 gigahertz (GHz) band, the 5 GHz band, the 60 GHz band, or other frequency bands. In some examples, wireless connection 16 may comply with one or more sets of standards, protocols, or technologies, such as Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies.

In one example, wireless connection 16 may comprise a peer-to-peer (P2P) connection established according to a Wi-Fi Direct (WFD) standard. The P2P connection provides a secure connection that connects wireless service seeker 12 to wireless service advertiser 14 at a data link layer, i.e., a MAC layer, in a Wi-Fi P2P Group without the need for a wireless access point. In other examples, wireless connection 16 may be established using Tunneled Direct Link Setup (TDLS) or a Wi-Fi in the infrastructure mode. WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters.

Wireless service seeker 12 and wireless service advertiser 14 may support one or more services over the P2P connection according to the Wi-Fi Direct Services (WFDS) standard so that one of the devices may wirelessly use the capabilities of the other device. The supported services may include send service, play service, print service, display service, wireless docking service, and wireless serial bus service. In order to support WFDS, each of wireless service seeker 12 and wireless service advertiser 14 may include an Application Service Platform (ASP) that implements the common functions needed for the device to advertise, seek out and manage the services.

The techniques of this disclosure are directed toward establishing a Wi-Fi Direct service between wireless service seeker 12 and wireless service advertiser 14. This disclosure primarily describes techniques for establishing a Wireless Serial Bus (WSB) service between wireless service seeker 12 and wireless service advertiser 14 to transport and receive data using a Media Agnostic Universal Serial Bus (MAUSB) protocol according to a selected transport mode in a WSB session of the WSB service. The WSB service may comprise one of a plurality of Universal Serial Bus (USB) functions offered by wireless service advertiser 14. The WSB service enables existing USB applications on wireless service seeker 12 to connect with the USB functions offered by wireless service advertiser 14 over wireless connection 16.

As described in more detail below, in order to establish the WSB service, wireless service seeker 12 and wireless service advertiser 14 perform discovery and WSB connection setup, including P2P connection setup and WSB session setup. Once the WSB service is established, wireless service seeker 12 and wireless service advertiser 14 may use the MAUSB protocol to perform USB device enumeration and USB data transfers over wireless connection 16. The MAUSB protocol is defined by the USB Implementers Forum (USB-IF).

The WSB service is conceptually comprised of four components: WSB discovery, WSB connection setup, Wi-Fi specific configurations, and USB data transfers using the MAUSB protocol. For example, the WSB discovery stage is managed via the WFDS ASP to enable wireless service seeker 12 to discover wireless service advertiser 14 and the service information for the WSB service offered by wireless service advertiser 14. After initial WSB discovery, wireless service seeker 12 can establish a WSB connection with wireless service advertiser 14 by setting up a P2P wireless connection and a new WSB session for the WSB service. Wireless service advertiser 14 may use the information provided by wireless service seeker 12 during the WSB connection setup to control access by wireless service seeker 12 to the WSB service offered by advertiser 14. After the WSB connection setup, the MAUSB protocol is used to perform USB device enumeration and USB data delivery.

After the P2P connection is established, the WSB session may be setup and maintained using an ASP coordination protocol deployed according to a transport mode for the WSB service. For example, the ASP coordination protocol may be deployed either over a User Datagram Protocol (UDP)/Internet Protocol (IP) stack or directly over a Media Access Control (MAC) layer. The transport mode for the ASP coordination protocol may be negotiated using a feature capability field in provision discovery request/response messages during the WSB connection setup.

According to the techniques of this disclosure, after the WSB connection setup is complete, the MAUSB protocol may transfer data over the P2P connection according to a transport mode selected for each WSB session of the WSB service. The MAUSB protocol may be deployed either over the UDP/IP stack or directly over the MAC layer. The transport mode for MAUSB protocol may be negotiated using a service information field advertised in a service discovery response message during the WSB discovery process, and using session information fields in provision discovery request messages and ASP session request messages during the WSB connection setup. For example, during the service discovery process, wireless service advertiser 14 identifies one or more supported transport modes for the MAUSB protocol in service information advertised for the WSB service. During the P2P connection setup and WSB session setup, wireless service seeker 12 indicates a selected one of the supported transport modes for the MAUSB protocol in session information for the WSB session.

Although the techniques of this disclosure are generally described with respect to a WSB service, it should be understood that the WSB service is only one example of a service that may be established over a Wi-Fi Direct connection consistent with this disclosure. Thus, although the techniques are described in the context of WSB service, other similar services, such as send service, play service, print service, display service, and wireless docking service, may likewise benefit from the techniques of this disclosure.

Figure 2:
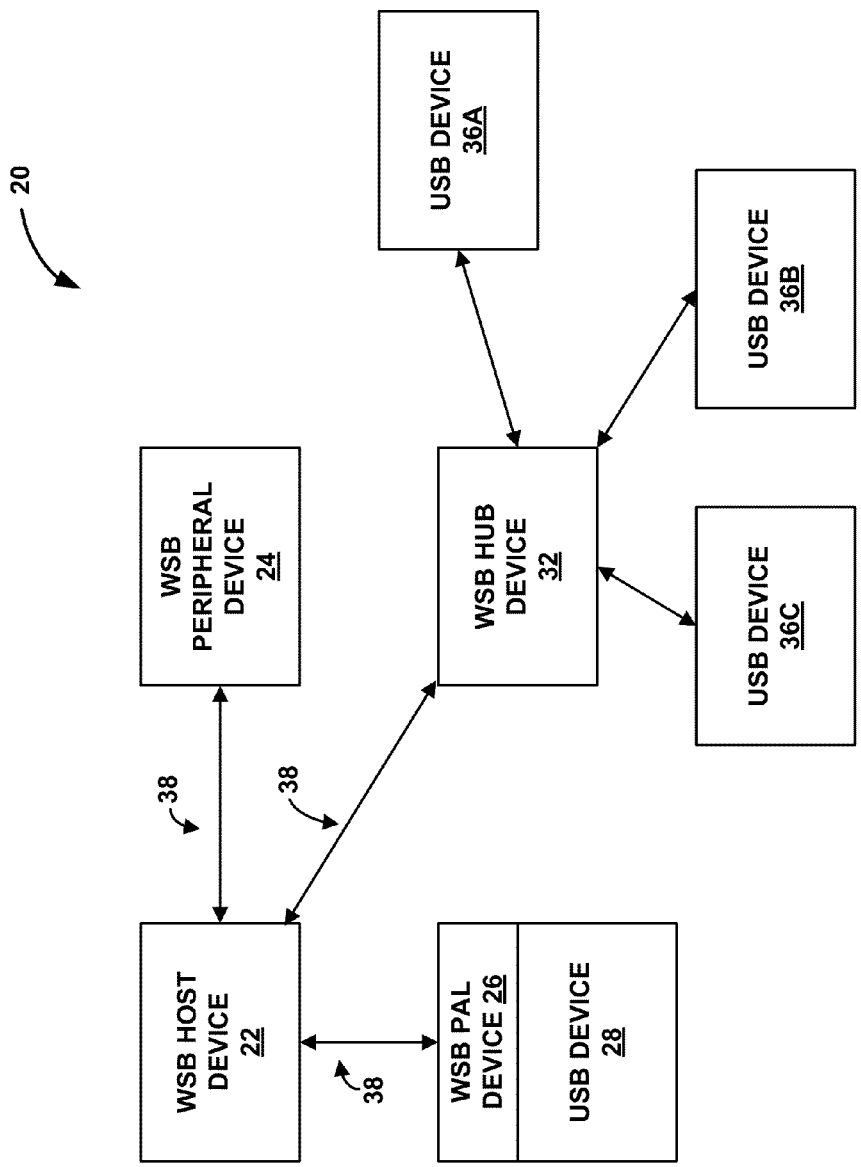
FIG. 2 is a block diagram illustrating another example wireless network including a Wireless Serial Bus (WSB) host device and several WSB client devices transferring data over wireless connections in accordance with the techniques of this disclosure.

FIG. 2 is a block diagram illustrating another example wireless network 20 that includes a Wireless Serial Bus (WSB) host device 22 and several WSB client devices communicating over WSB connections 38 established in accordance with the techniques of this disclosure. As illustrated in FIG. 2, a WSB client device may be any of a WSB peripheral device 24, a WSB Protocol Adaptation Layer (PAL) device 26 connected to a USB device 28, or a WSB hub device 32 that connects to downstream USB devices 36A-36C ("USB devices 36"). The components of FIG. 2 may communicate via WSB connections 38. In general, WSB host device 22 may operate in a substantially similar fashion as wireless service seeker 12 from FIG. 1, and any of the WSB client devices 24, 26, 32 may operate in a substantially similar fashion as wireless service advertiser 14 from FIG. 1.

In general, computing devices may communicate with a variety of periphery devices using a communication standard. One such communication standard includes a Universal Serial Bus (USB) connection. Some examples of peripheral devices that may use a USB connection include mice, keyboards, displays, digital cameras, printers, personal media players, mass storage devices such as flash drives, network adapters, and external hard drives. For many of those devices, USB has become a very common communication standard that facilitates peripheral device connection. Accordingly, this disclosure may refer to a "USB device" as a peripheral device having a USB connection capable of communicating with a host computing device. In some examples, a USB device may communicate with the host device according to a common USB communication specification.

WSB host device 22 may be a mobile device, such as a smartphone or other mobile handset, a tablet computer, a laptop computer, or another electronic device with wireless communication capabilities, or a component of a larger device or system. WSB host device 22 may execute a WSB service seeker application that discovers WSB services and starts a WSB session with one of the WSB client devices 24, 26, 32. In addition, WSB host device 22 may perform the MAUSB host role in the MAUSB protocol. WSB host device 22 may perform similar functions as a USB host enabling connection to any of WSB peripheral device 24, WSB PAL device 26, and WSB hub device 32.

Each of WSB client devices 24, 26, 32 may be a mobile device, such as a smartphone or other mobile handset, a tablet computer, a laptop computer, or another electronic device with wireless communication capabilities, or a component of a larger device or system. Each of WSB client devices 24, 26, 32 may execute a WSB service advertiser application that responds to discovery queries from WSB host device 22, and communicates with the USB host of WSB host device 22 for USB data delivery. Each of WSB client devices 24, 26, 32 may perform the MAUSB dock/device role in the MAUSB protocol. For example, WSB client devices 24, 26, 32 may be defined to encapsulate MAUSB protocol data transfers directly over the Wi-Fi MAC layer. In other cases, the WSB client devices 24, 26, 32 are defined to enable MAUSB protocol data transfers over the IP stack.

WSB peripheral device 24 may perform similar functions as a USB peripheral enabling connection to WSB host device 22. WSB PAL device 26 may be a standalone a system that includes the WSB PAL and a single USB port with an optional connector. As illustrated in FIG. 2, WSB PAL device 26 is connected to USB device 28 and may operate as a WSB peripheral device. In other examples, WSB PAL device 26 may operate as a WSB hub device when connected to a USB hub. WSB PAL device 26 may not use the WSB protocol when it is unconnected. WSB hub device 32 may support the connection of one or more other devices, such as USB devices 36, and may enable communication between USB devices 36 and USB host device 22. In some examples, WSB hub device 32 may be integrated into another device, such as a computing device (e.g., a smartphone, tablet computer, laptop computer, desktop computer, WiFi enabled television, or the like) or a peripheral device (e.g., a USB keyboard device that includes an incorporated WSB hub). WSB hub device 32 may perform similar functions as a USB hub enabling connection to WSB host device 22. The wireless downstream connections of WSB hub device 32 to USB device 36 are beyond the scope of the WSB service.

As an example, one or more of WSB client devices 24, 26 and 32 may comprise a display. The display may include any of a variety of video output devices such as a cathode ray tube (CRT), a liquid crystal display (LCD), a plasma display, a light emitting diode (LED) display, an organic light emitting diode (OLED) display, or another type of display device. In these or other examples, the display may be an emissive display or a transmissive display. In some instances, the display may include a Wi-Fi enabled television or another device capable of receiving media data from one or more wireless connections.

As another example, one or more of WSB client devices 24, 26 and 32 may comprise a human interface device (HID) that may include a variety of input devices. The HID may include a device that allows a user to interact with WSB host device 22. The HID may generally include a mouse, keyboard, trackpad, camera, or the like. In the example of this disclosure, the HID may communicate with WSB host device 22 via a wireless connection. For example, the HID may be Wi-Fi enabled and support WFDS to establish WSB connection 38 with WSB host device 22.

Figure 3:
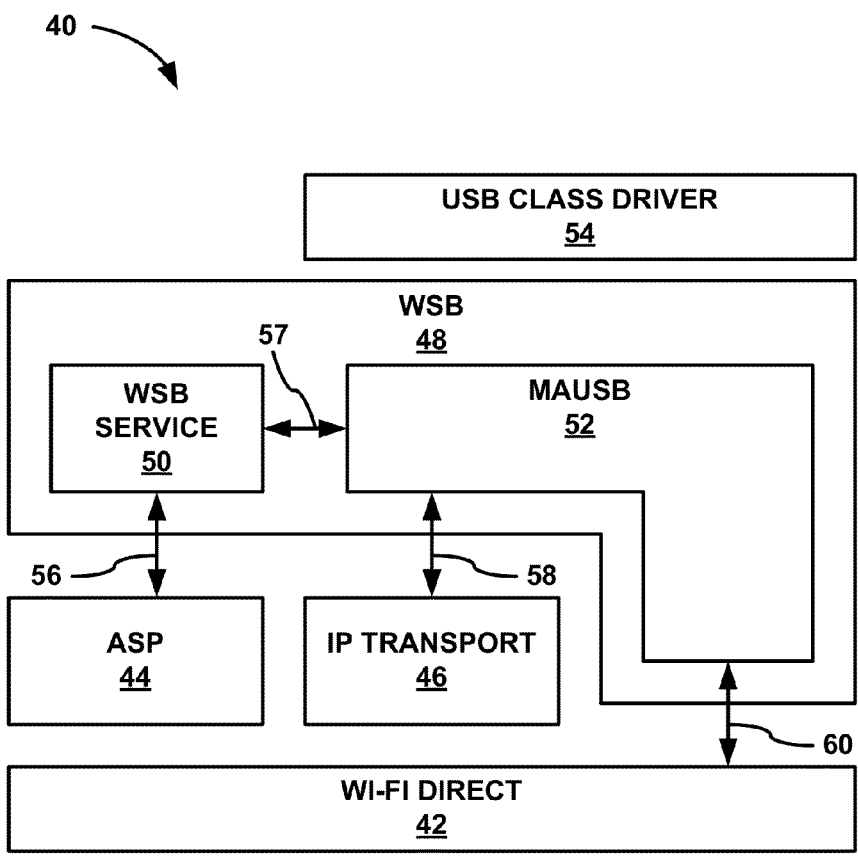
FIG. 3 is a conceptual diagram illustrating an example WSB architecture that includes a MAUSB component configured to operate either over an IP stack or directly over a MAC layer.

FIG. 3 is a conceptual diagram illustrating an example WSB architecture 40 that includes a MAUSB component 52 configured to operate either over an IP stack or directly over a MAC layer. WSB architecture 40 may represent the architecture of a WSB service seeker application operating within a wireless device, such as wireless service seeker 12 from FIG. 1 or WSB host device 22 from FIG. 2. In addition, WSB architecture 40 may represent the architecture of a WSB service advertiser application operating within a wireless device, such as wireless service advertiser 14 from FIG. 1 or any of WSB peripheral device 24, WSB PAL 26, or WSB hub device 32 from FIG. 2.

WSB architecture 40 includes a Wi-Fi Direct component 42 that supports an application service platform (ASP) 44 and an IP transport 46. WSB architecture 40 also includes a WSB component 48 that includes a WSB service component 50 and MAUSB component 52. WSB architecture 40 further includes a USB class driver 54. USB class driver 54 is a device driver configured to operate a large number of different USB devices that share a common USB protocol. In some examples, more specific USB device drivers that offer different or expanded functionality may operate on top of USB class driver 54.

Wi-Fi Direct component 42 is configured to establish a P2P connection, e.g., wireless connection 16, between, for example, wireless service seeker 12 and wireless service advertiser 14 over wireless network 10. The P2P connection connects wireless service seeker 12 to wireless service advertiser 14 at a data link layer, i.e., a MAC layer, in a Wi-Fi P2P Group. In other examples, WSB architecture 40 may instead include a Tunneled Direct Link Setup (TDLS) component configured to establish a direct link between wireless devices over a wireless network. In still other examples, WSB architecture 40 may instead include a Wi-Fi component operating in an infrastructure mode to establish a connection between wireless devices over a wireless network via a wireless access point.

WSB service component 50 is deployed on top of ASP 44. WSB service component 50 is configured to interact with ASP 44 to perform service discovery and connection setup for a WSB service. WSB service component 50 and ASP 44 may exchange method and event primitives for service discovery and connection setup over communication path 56. For example, WSB service component 50 may specify a protocol transport mode, e.g., either over an IP stack or directly over a MAC layer, of a MAUSB protocol for each WSB session of the WSB service. As described in further detail with respect to FIGS. 4A and 4B, during service discovery, WSB service component 50 of a wireless service advertiser application may advertise supported transport modes for the MAUSB protocol to ASP 44. In addition, during P2P connection setup and WSB session setup, WSB service component 50 of a wireless service seeker application may request a WSB session that uses a selected transport mode for the MAUSB protocol. In this way, WSB service component 50 includes the transport mode for the MAUSB protocol as part of the service discovery negotiation, the P2P connection setup negotiation, and the WSB session setup negotiation for the WSB service.

ASP 44 is a logical entity that implements common functions used by applications and services operating over Wi-Fi Direct component 42 or another wireless connection. In some cases, ASP 44 may comprise a WFDS ASP that implements common functions used by applications and services conforming to the WFDS technical specification. In WSB architecture 40 illustrated in FIG. 5, ASP 44 is configured to execute actions initiated by WSB service component 50. For example, as described in further detail with respect to FIGS. 4A and 4B, WSB service component 50 initiates a service discovery process by advertising a WSB service to ASP 44 over communication path 56. In response, ASP 44 advertises the WSB service to wireless service seekers including service information that identifies one or more transport modes for the MAUSB protocol supported by the wireless service advertiser application.

After the discovery process is complete, ASP 44 may perform a WSB connection setup, including a P2P connection setup and a WSB session setup, to establish a WSB session of the discovered WSB service offered by the wireless service advertiser. For example, as described in further detail with respect to FIGS. 4A and 4B, WSB service component 50 selects one of the supported transport modes for the MAUSB protocol to be used for a requested WSB session. ASP 44 then requests the WSB session including session information that indicates the selected one of the supported transport modes for the MAUSB protocol in the requested WSB session. ASP 44 may execute over-the-air (OTA) messaging for each phase of the WSB connection setup. ASP 44 may also execute the ASP coordination protocol to perform the WSB session setup and maintain the WSB session for the WSB service.

After the WSB session setup is complete, WSB service component 50 activates MAUSB component 52 over communication path 57 to perform USB device enumeration and USB data delivery using the MAUSB protocol over the P2P connection. For USB data delivery, the MAUSB component 52 establishes a WSB data path 58 over IP transport 46 or a WSB data path 60 directly over the MAC layer. In this way, the MAUSB protocol may be deployed either over the IP stack or directly over the MAC layer.

Figure 4A:
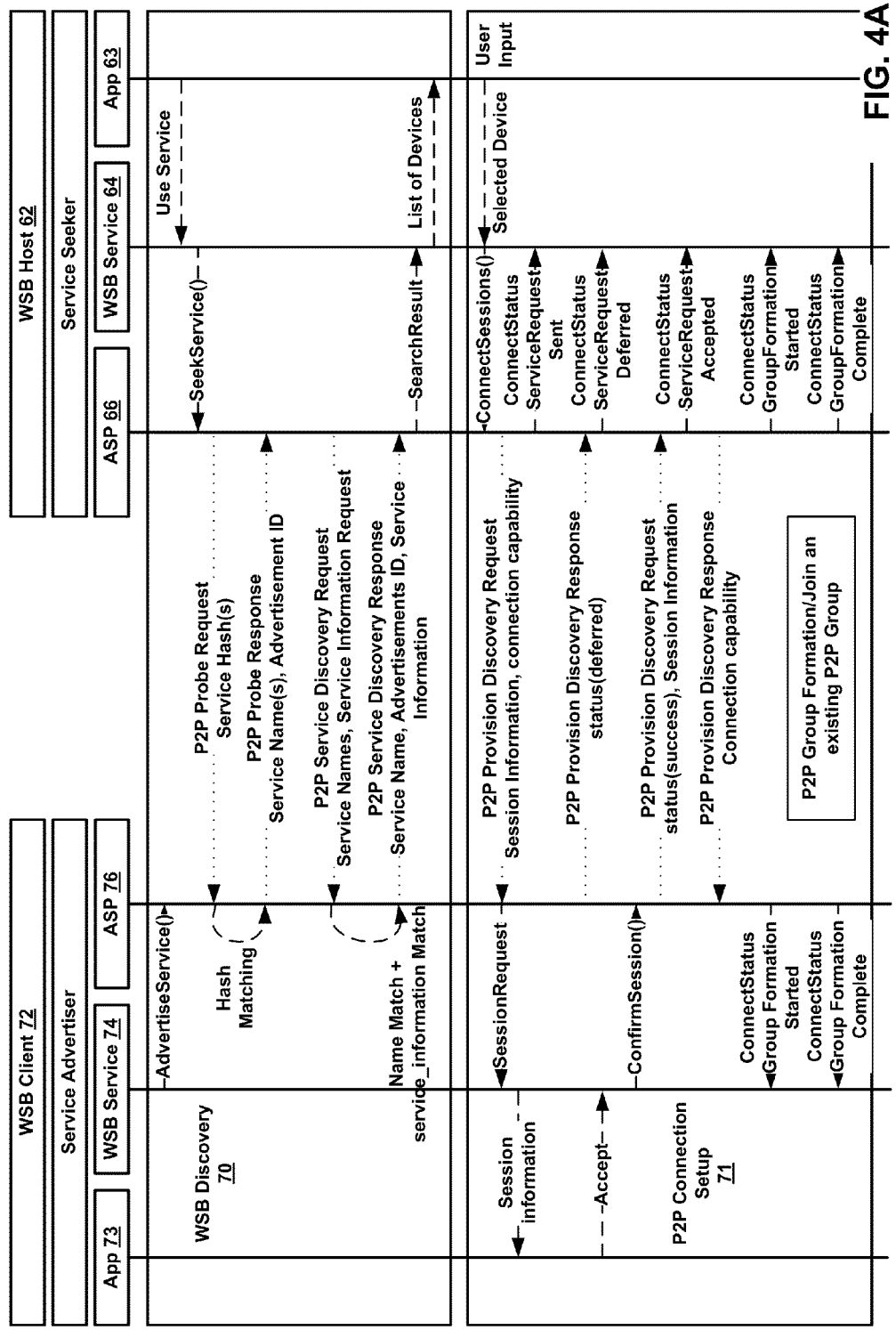
FIGS. 4A and 4B are conceptual diagrams illustrating a call flow for establishing WSB service between a wireless service seeker and a wireless service advertiser.
Figure 4B:
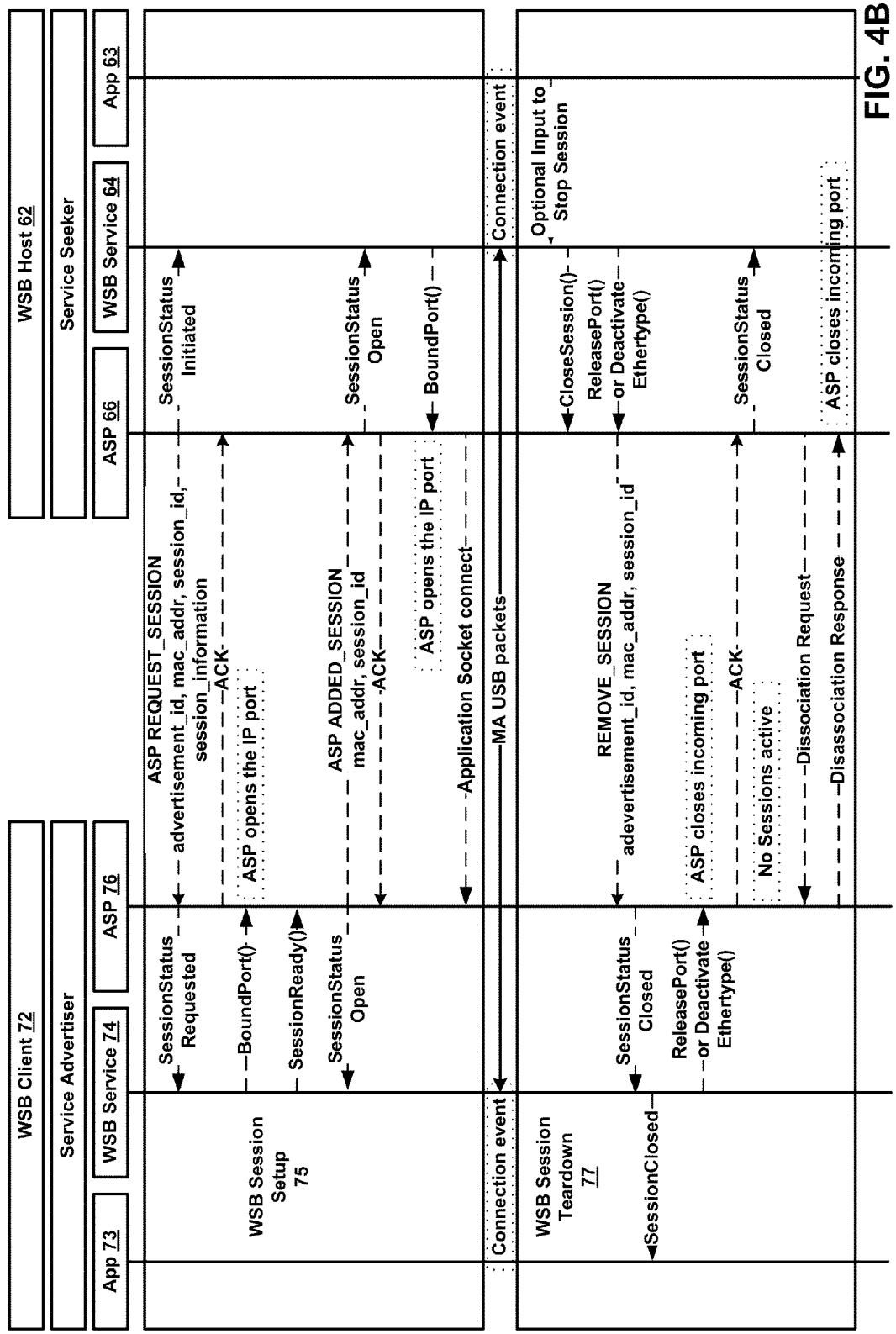

FIGS. 4A and 4B are conceptual diagrams illustrating an example call flow for establishing WSB service between a WSB host device 62 operating as a service seeker and a WSB client device 72 operating as a service advertiser. For example, FIGS. 4A and 4B illustrate a flow of method and event primitives that may be communicated between Application 63, WSB service 64 and ASP 66 of WSB host device 62, and between Application 73, WSB service component 74 and ASP 76 of WSB client device 72. In addition, FIGS. 4A and 4B illustrate a flow of messages that may be transmitted between ASP 66 of WSB host device 62 and ASP 76 of WSB client device 72.

FIGS. 4A and 4B illustrate the call flow for each of the three phases generally included in WSB service setup: a WSB discovery phase 70, a P2P connection setup phase 71, and a WSB session setup phase 75. In some examples, this disclosure may collectively refer to P2P connection setup phase 71 and WSB session setup phase 75 as a WSB connection setup phase. FIG. 4B additionally illustrates the call flow for a WSB session teardown phase 77. Each of the phases includes method and event calls between the WSB service components and the ASPs of WSB host device 62 and WSB client device 72. The parameters of the method and event primitives are described below, and may be further defined in the WFDS technical specification.

FIG. 4A illustrates the call flows for each of WSB discovery phase 70 and P2P connection setup phase 71. In the example of FIG. 4A, ASP 66 of WSB host device 62 and ASP 76 of WSB client device 72 execute over-the-air messaging to perform both WSB discovery phase 70 and P2P connection setup phase 71. FIG. 4B illustrates the call flows for each of WSB session setup phase 75 and WSB session teardown phase 77. In the example of FIG. 4B, ASP 66 of WSB host device 62 and ASP 76 of WSB client device 72 may execute over-the-air messaging and the ASP coordination protocol to perform both WSB session setup phase 75 and WSB session teardown phase 77.

The description of FIGS. 4A and 4B below will proceed in chronological order from the top of FIG. 4A to the bottom of FIG. 4B. Each arrowhead shown in FIGS. 4A and 4B represents a stop at a component that then interacts with the communication as described below. The sequence of messages shown in FIGS. 4A and 4B is an example, and the techniques need not necessarily be performed in the order shown in FIGS. 4A and 4B, and fewer, additional, or alternative steps may be performed.

WSB discovery phase 70 illustrated in FIG. 4A includes both device discovery and service discovery processes, described in more detail below. In general, during WSB discovery phase 70, WSB client device 72 advertises a WSB service offered by client device 72, and WSB host device 62 discovers the WSB service provided by client device 72. The discovery processes are executed at each of WSB host device 62 and WSB client device 72 using the WFDS Application Service Platform. The WSB service component at each of WSB host device 62 and WSB client device 72 does not directly perform the discovery processes, but instead provides service information to the associated ASP so that the ASP can use the underlining mechanisms to perform the discovery processes of WSB discovery phase 70. As illustrated in FIG. 4A, WSB discovery process 70 may be performed using SeekService and AdvertiseService methods between the WSB service components and the ASPs at each of WSB host device 62 and WSB client device 72.

As illustrated in FIG. 4A, WSB service component 74 of client device 72 advertises a WSB service offered by client device 72 to ASP 76 to initiate responses to discovery requests received during WSB discovery phase 70. For example, WSB service component 74 calls an AdvertiseService method that includes a plurality of parameters configured to indicate service information for an advertised WSB service to ASP 76 to initiate the discovery process.

In one example, the WSB AdvertiseService primitive has the following format: AdvertiseService(service_name, auto_accept, service_information, service_status). WSB service component 74 of client device 72 may specify the service_name parameter to be "org.wi-fi.wfds.wsb.client." In other examples, the service_name parameter may be set to more specifically identify a requested USB function. Alternate service_name parameter structures are described in more detail at the end of this disclosure.

The auto_accept parameter indicates whether ASP 76 automatically accepts a WSB session request or waits to receive a session confirmation from WSB service component 74. WSB service component 74 may set the value of the auto_accept parameter as determined by user configuration or policy. The service_status parameter indicates whether the advertised WSB service is available to use.

The service_information string is an encoded text string of Extensible Markup Language (XML) data that contains the element "wsbServiceInformation" defined by the XML schema described in more detail at the end of this disclosure. The service_information string describes USB function information for the advertised WSB service offered by WSB client device 72. In other examples, the service_information string may more specifically describe the USB function information for the requested WSB service, including the transport mode for the WSB service. Alternate service_information parameter structures are described in more detail at the end of this disclosure.

According to the techniques of this disclosure, the service_information string may further identify one or more transport modes for the MAUSB protocol supported by WSB client device 72. The identified transport modes specify whether the MAUSB protocol can be deployed over an IP stack or directly over the MAC layer once the WSB connection is established for the WSB service.

In other examples, the AdvertiseService primitive may include a separate parameter configured to indicate a transport mode for the advertised WSB service. For example, if the MAUSB protocol executed by WSB client device 72 runs directly over the MAC layer to perform USB data delivery once the WSB connection is established, the transport mode parameter may be set equal to 0. If the MAUSB protocol executed by WSB client device 72 runs over the IP stack to perform USB data delivery once the WSB connection is established, the transport mode parameter may be set equal to 1.

ASP 76 of WSB client device 72 uses the parameters advertised by WSB service component 74 to create responses for device and service discovery requests received for the advertised WSB service. For example, ASP 76 may create service information for the advertised WSB service that identifies the supported transport modes for the MAUSB protocol.

As illustrated in FIG. 4A, application 63 of host device 62 sends a Use Service request to WSB service component 64 of host device 62 to use a particular WSB service. WSB service component 64 then requests ASP 66 to initiate a discovery process for the particular WSB service having certain service capabilities. For example, WSB service component 64 calls a SeekService method that includes a plurality of parameters configured to indicate the service capabilities for the requested WSB service to ASP 66 to initiate the discovery process.

In one example, the WSB SeekService primitive has the following format: SeekService (service_name, exact_search, mac_address, service_information_request). To seek for a WSB client device that offers the requested WSB service with the service capabilities, WSB service component 64 of host device 62 may specify the service_name parameter to be "org.wi-fi.wfds.wsb.client" with the exact_search parameter set equal to true in order to only discover devices offering WSB services. In other examples, the service_name parameter may be set to more specifically identify a requested USB function. Alternate service_name parameter structures are described in more detail at the end of this disclosure.

In addition, the service_information_request string may be either null or a substring that describes USB function information and is capable of matching a service_information string advertised by a client device. In some examples, the service_information_request string may be set to match a sevice_information string that more specifically describes USB function information for the requested WSB service, including the transport mode for the WSB service. Alternate service_information parameter structures are described in more detail at the end of this disclosure.

In some examples, the service_information_request string may further identify one or more transport modes for the MAUSB protocol supported by WSB host device 62. The identified transport modes specify whether the MAUSB protocol can be deployed over an IP stack or directly over the MAC layer once the WSB connection is established for the WSB service. In other examples, the SeekService primitive may include a separate parameter configured to indicate a transport mode for the requested WSB service.

ASP 66 of WSB host device 62 uses the parameters provided by WSB service component 64 to perform device discovery and service discovery for the requested WSB service. ASP 66 performs device discovery by sending a P2P Probe Request message that includes a service hash based on the service name for the requested WSB service. If the requested service name matches an advertised service name, ASP 76 sends a P2P Probe Response message to host device 62.

ASP 66 also performs service discovery, i.e., pre-association service discovery, by sending a P2P Service Discovery Request message that includes the service name and a service_information_request based on the parameters provided by WSB service component 64. For example, the service information_request may indicate the service_information_request string for the requested WSB service. If the service_information_request for the requested WSB service matches service information for the advertised WSB service, ASP 76 sends a P2P Service Discovery Response message to host device 62 to confirm that client device 72 offers the requested WSB service. The P2P Service Discovery Response message includes the service information for the advertised WSB service that identifies the transport modes for the MAUSB protocol supported by WSB client device 72.

Upon receipt of the P2P Probe Response message and/or the P2P Service Discovery Response message, ASP 66 of host device 62 sends a SearchResults event to WSB service component 64 to report the discovered WSB service. WSB service component 64 then reports a List of Devices to application 63 that identifies client device 72 as offering the requested WSB service.

In general, during P2P connection setup phase 71, WSB host device 62 connects to WSB client device 72 at a data link layer, i.e., the MAC layer, in a Wi-Fi P2P Group. The connection process is executed at each of WSB host device 62 and WSB client device 72 using the WFDS Application Service Platform. The WSB service component at each of WSB host device 62 and WSB client device 72 does not directly perform the connection process, including P2P Provision Discovery, P2P Group Formation, or P2P Invitation, but instead provides information to the associated ASP so that the ASP can use the underlining mechanisms to perform the connection process of P2P connection setup phase 71. As illustrated in FIG. 4A, P2P connection setup process 71 may be performed using ConnectSessions and ConfirmSession methods between the WSB service components and the ASPs at each of WSB host device 62 and WSB client device 72.

As illustrated in FIG. 4A, application 63 of host device 62 indicates a Selected Device from the List of Devices in accordance with user input. WSB service component 64 of WSB host device 62 requests ASP 66 to initiate a WSB session request for the discovered WSB service offered by WSB client device 72. For example, WSB service component 64 calls a ConnectSessions method that includes parameters configured to identify WSB client device 72, indicate how to establish the P2P connection, and request a WSB session.

In addition, according to the techniques of this disclosure, WSB service component 64 selects a transport mode for the MAUSB protocol in the requested WSB session. For example, WSB service component 64 may select the transport mode for the MAUSB protocol in the requested WSB session based on the supported transport modes identified in the service information from WSB client device 72 and transport mode preferences of WSB host device 62.

In one example, the WSB ConnectSessions primitive has the following format: ConnectSessions(List of(service_mac, advertisement_id), session_information, network_role). The session_information string is an encoded text string of XML data that contains the element "wsbSessionInformation" defined by the XML schema. The XML data contains a PIN which can be used by WSB client device 72 to make a decision on whether to accept the connection initiation. The network role parameter identifies to ASP 66 whether host device 62 insists on being a P2P group owner (GO) for the requested WSB session or does not care. The P2P connection can be established as long as both host device 62 and client device 72 do not simultaneously insist on being the P2P GO for the same WSB session.

According to the techniques of this disclosure, the session_information includes a transport mode parameter configured to indicate the selected transport mode for the MAUSB protocol in the requested WSB session. For example, if the MAUSB protocol executed by WSB host device 62 runs directly over the MAC layer to perform USB data delivery once the WSB connection is established, the transport mode parameter may be set equal to 0. If the MAUSB protocol executed by WSB host device 62 runs over the IP stack to perform USB data delivery once the WSB connection is established, the transport mode parameter may be set equal to 1.

ASP 66 of WSB host device 62 performs the connection process by exchanging P2P Provision Discovery Request messages and P2P Provision Discovery Response messages with WSB client device 72. The provision discovery exchange determines how to the P2P connection between host device 62 and client device 72 will be established, the network_role assumed by each device, and a transport mode used for the MAUSB protocol in the requested WSB session. For example, the P2P Provision Discovery Request message includes the session information indicating the selected transport mode for the MAUSB protocol in the requested WSB session. During the exchange of the P2P Provision Discovery Request and Response messages, ASP 66 of host device 62 updates the status of the WSB service request from Sent to Deferred to Accepted.

As an example, if there is no P2P Persistent Group previously formed between WSB host device 62 and WSB client device 72, ASP 66 of host device 62 executes P2P Provision Discovery and P2P Group Formation procedures to create a P2P Group between WSB host device 62 and WSB client device 72. As another example, if there is an existing P2P Persistent Group previously formed between WSB host device 62 and WSB client device 72 that ASP 66 of host device 62 intends to use, ASP 66 executes P2P Provision Discovery and P2P Invitation procedures to re-invoke the P2P Persistent Group between WSB host device 62 and WSB client device 72.

In response to receipt of the P2P Provision Discovery Request from WSB host device 62, ASP 76 of WSB client device 72 sends a SessionRequest event to WSB service component 74 to request a decision of whether to accept or reject the WSB session initiation request. In one example, WSB SessionRequest event has the following format: SessionRequest(advertisement_id, session_mac, session_device_name, session_id, session_information). The parameters included in the SessionRequest primitive are configured to identify WSB client device 72 and the requested WSB session for the WSB service.

If WSB client device 72 receives the incoming service request via the SessionRequest event and auto_accept was set to false when the AdvertiseService method was called, application 73 of client device 72 should make a decision on whether to accept the WSB session initiation based on the received session_information string. As discussed above, the session_information string includes the transport mode parameter configured to indicate the selected transport mode for the MAUSB protocol in the requested WSB session. As long as the selected transport mode for the MAUSB protocol is one of the transport modes supported by client device 72, application 73 of client device 72 should accept the requested WSB session.

Application 73 of WSB client device 72 may process a PIN received in the session_information string from WSB host device 62. WSB client device 72 may be configured with an expected value of the PIN. If the PIN text string matches the expected value of WSB client device 72, application 73 may confirm to accept the SessionRequest event by calling a ConfirmSession method.

In one example, WSB ConfirmSession method has the following format: ConfirmSession(session_mac, session_id, confirmed). The parameters included in the ConfirmSession method identify the requested WSB session for the WSB service and whether the WSB session initiation is accepted. For example, when application 73 of WSB client device 72 confirms acceptance of the SessionRequest event, WSB service component 74 of client device 72 shall call the ConfirmSession method with the confirmed parameter set equal to true. In response to the acceptance of the requested WSB connection initiation, ASP 66 of host device 62 and ASP 76 of client device 72 update the status of the P2P Group formation from started to complete.

In general, during WSB session setup phase 75, WSB host device 62 sets up an ASP session with the connected WSB client device 72, and WSB client device 72 may use the information provided by WSB host device 72 during the session setup to decide whether to accept the session setup attempt. The session setup processes are executed at each of WSB host device 62 and WSB client device 72 using the WFDS Application Service Platform. The WSB service component at each of WSB host device 62 and WSB client device 72 does not directly perform the session setup processes, but instead provides information to the associated ASP so that the ASP can use the underlining mechanisms to perform the session setup processes of WSB session setup phase 75. As illustrated in FIG. 4B, WSB session setup process 75 may be performed using BoundPort, and optionally ActivateEthertype, methods between the WSB service components and the ASPs at each of WSB host device 62 and WSB client device 72.

As shown in FIG. 4B, after establishment of the P2P connection for the WSB service, ASP 66 of WSB host device 62 performs WSB session setup processes by sending an ASP Request_Session message using the ASP coordination protocol for the WSB service. According to the techniques of this disclosure, the ASP Request_Session message includes the session_information string that indicates the selected transport mode for the MAUSB protocol in the requested WSB session.

Upon receipt of the ASP Request_Session message, ASP 76 of WSB client device 72 updates the status of the WSB session to Requested. In response to the status update, WSB service component 74 of client device 72 may open the requested WSB session by calling a SessionReady method. In other examples, WSB service component 74 may instead decide to abort the requested WSB session.

When WSB service component 74 opens the requested WSB session, WSB service component 64 may then activate data packet processing at ASP 76 based on the selected transport mode for the MAUSB protocol in the WSB session. For example, WSB service component 64 call the BoundPort method to open ports associated with the established WSB session when the MAUSB protocol for the WSB service is deployed over the IP stack. In one example, the WSB BoundPort method has the following format: BoundPort(session_mac, session_id, ip_address, port, proto). WSB service component 74 of WSB client device 72 calls the BoundPort method to open one Transmission Control Protocol (TCP) port and one UDP port at ASP 76 for the MAUSB protocol. WSB service component 74 may use a port value that is to be determined, and a proto value of 6 to indicate TCP. WSB service component 74 may also use a port value that is to be determined, and a proto value of 17 to indicate UDP.

In according with the techniques of this disclosure, WSB service component 64 may not need to call a separate method to activate data packet processing at ASP 76 when the MAUSB protocol for the WSB service is deployed directly over the MAC layer. In other examples, WSB service component 74 may call an ActivateEthertype method to activate processing of a particular Ethernet type when the MAUSB protocol for the WSB service is deployed directly over the MAC layer. In one example, the WSB ActivateEthertype method has the following format: ActivateEtherType(session_mac, session_id, ether_type). The ether_type parameter is configured to indicate the particular Ethernet type for the WSB Service. The ether_type value used to identify the MAUSB protocol may be determined later as part of the WFDS technical specification or another specification.

The SessionReady method call by WSB service component 74 causes ASP 76 to update the status of the WSB session to Open. In addition, ASP 76 sends an ASP Added_Session message using the ASP coordination protocol for the WSB service. Upon receipt of the ASP Added_Session message, ASP 66 of host device 62 updates the status of the WSB session to Open. WSB service component 64 of WSB host device 62 may then activate data packet processing at ASP 66 based on the selected transport mode for the MAUSB protocol in the WSB session. For example, WSB service component 64 may call the BoundPort, or optionally the ActivateEtherType, method to open ports or activate Ethernet types associated with the established WSB session.

After WSB session setup process 75 is completed, the WSB service component at each of WSB host device 62 and WSB client device 72 activates the MAUSB protocol to perform USB device enumeration and exchange MAUSB packets for the WSB session over the P2P wireless connection. The MAUSB protocol may perform the operations of USB device enumeration and USB data delivery according to the selected one of the supported transport modes for the WSB session.

During WSB session teardown phase 77, WSB host device 62 terminates the WSB service by closing the established WSB session. The session teardown process is executed at each of WSB host device 62 and WSB client device 72 using the WFDS Application Service Platform. The WSB service component at each of WSB host device 62 and WSB client device 72 does not directly perform the session teardown process, but instead provides information to the associated ASP so that the ASP can use the underlining mechanisms to perform the session teardown processes of WSB session teardown phase 77. As illustrated in FIG. 4B, WSB session teardown process 77 may be performed using the CloseSession method between the WSB service component and the ASP at either of WSB host device 62 and WSB client device 72.

As illustrated in FIG. 4B, the session teardown process may be explicitly triggered by application 63 of host device 62. In other examples, the session teardown process may be autonomously trigged by WSB service component 64 of host device 62. In still other examples, WSB host device 62 may tear down the established WSB session under any of the following conditions: (1) WSB host application 63 receives an explicit instruction from a user to tear down the WSB session, WSB client application 73 receives an explicit instruction from a user to tear down the WSB session, (3) the MAUSB protocol executed on WSB host device 62 detects that WSB client device 72 cannot be reached over a period of time and sends an indication to WSB service component 64 to tear down the WSB session, and (4) after a P2P connection failure, ASP 66 of WSB host device 62 intends to reconnect to the client device 72 at the MAC layer but fails a number of times.

In order to tear down a particular established WSB session, WSB service component 64 requests ASP 66 to initiate a session teardown process for the particular WSB session. For example, WSB service component 64 calls a CloseSession method that includes parameters configured to identify the particular WSB session to be closed. In one example, the CloseSession primitive has the following format: CloseSession(session_mac, session_id).

In the case where the MAUSB protocol for the WSB session is deployed over the IP stack, once the CloseSession method is executed by ASP 66 of WSB host device 62, the port that is associated with the WSB session to be closed, and not associated with any other open ASP sessions, will return to a blocked state. In some cases, WSB service component 64 may call a ReleasePort method to block the port at ASP 66. In the case where the MAUSB protocol for the WSB service is deployed directly over the MAC layer, once the CloseSession method is executed by ASP 66, the processing of the Ethernet type used for the MAUSB protocol for the WSB session to be terminated, and that is not used with any other open ASP Sessions, will be deactivated. In some cases, WSB service component 64 may call a DeactiveEtherType method to deactivate the Ether type at ASP 66. WSB service component 74 of WSB client device 72 may call the same methods to block ports and deactivate Ethernet types associated with the closed WSB session.

ASP 66 of WSB host device 62 closes the WSB session with WSB client device 72 by sending a Remove_Session message using the ASP coordination protocol. Upon receipt of the Remove_Session message, ASP 76 of client device 72 updates the status of the WSB session to Closed. Upon receipt of an acknowledgment of the Remove_Session message, ASP 66 of host device 62 similarly updates the status of the WSB session to Closed. Once the WSB session is closed, ASP 66 of host device 62 and ASP 76 of client device 72 execute over-the-air messaging to send dissociation messages.

Figure 5:
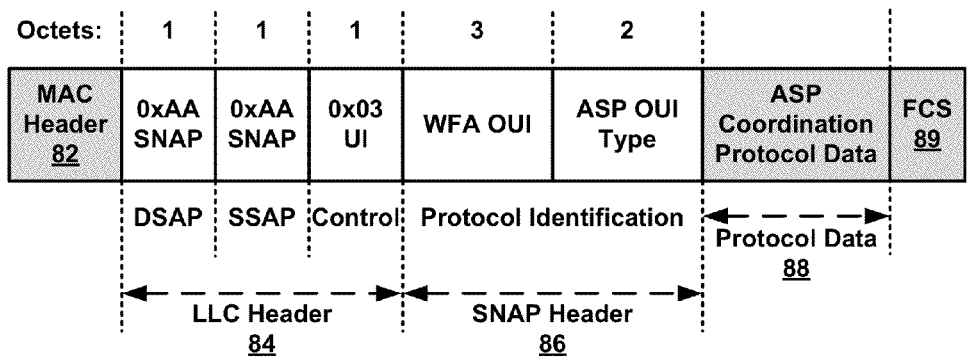
FIG. 5 is a conceptual diagram illustrating an example packet structure that encapsulates an ASP coordination protocol for a WSB session deployed directly over the MAC layer.

FIG. 5 is a conceptual diagram illustrating an example packet structure 80 that encapsulates an ASP coordination protocol for a WSB service deployed directly over the MAC layer. As described above, the ASP coordination protocol for the WSB service may run either over the IP stack or directly over the MAC layer (i.e., raw MAC). The ASP, e.g., ASP 44 from FIG. 3, selects which transport mode the ASP Coordination Protocol should use based on the ASP specific information exchanged during the P2P connection setup phase. Specifically, the provision discovery request identifies the selected transport mode for the ASP coordination protocol based on the coordination protocol transport bitmask in the provision discovery request, and the provision discovery response confirms the selected transport mode for the ASP coordination protocol based on the coordination protocol transport bitmask in the provision discovery response.

When deploying the ASP coordination protocol directly over the MAC layer, ASP coordination protocol data 88 is encapsulated by a Sub-Network Access Protocol (SNAP) header 86 that identifies the ASP coordination protocol. As illustrated in FIG. 5, packet structure 80 includes an IEEE 802.11 MAC header 82, a logical link control (LLC) header 84, SNAP header 86, protocol data 88, and a frame check sequence (FCS) 89. MAC header 82 may include a source MAC address and a destination MAC address of the packet, e.g. the MAC addresses of wireless service seeker 12 and wireless service advertiser 14. Wireless service seeker 12 and wireless service advertiser 14 may transmit packets having packet structure 80 to perform ASP coordination protocol communications directly over the MAC layer.

In the example of FIG. 5, LLC header 84 may include a destination service access point (DSAP) field having value 0xAA, a source service access point (SSAP) header having value 0xAA, and an Unnumbered Information (UI) or control field having value 0x03. Each of the three fields included in the LLC header 84 comprises a one-octet sized field value. In addition, SNAP header 86 includes a five-octet sized protocol identification field includes a three-octet sized Organizationally Unique Identifier (OUI) value and a two-octet sized protocol identification OUI Type value that identify the protocol running on top of SNAP. As illustrated in FIG. 5, the OUI value is a Wi-Fi Alliance (WFA) specific OUI value, which may have a hexadecimal value of 0x50-6F-9A. As further illustrated in FIG. 5, the protocol identification OUI Type value is an ASP specific OUI Type value, which may have a hexadecimal value of 0x14-00. The ASP OUI Type value used to identify the ASP coordination protocol may be assigned later as part of the WFDS technical specification or another specification.

Packet structure 80 further includes ASP coordination protocol data 88, which may include messages, functions, events, commands, and payloads associated with the ASP coordination protocol. ASP coordination protocol data 88 may be of variable length depending on the message and the contents of the message being sent. FCS 89 comprises a checksum or a frame check sequence based on the content of packet format 80, and allows wireless service seeker 12 and wireless service advertiser 14 to detect if content becomes corrupted during data transmission.

Figure 6:
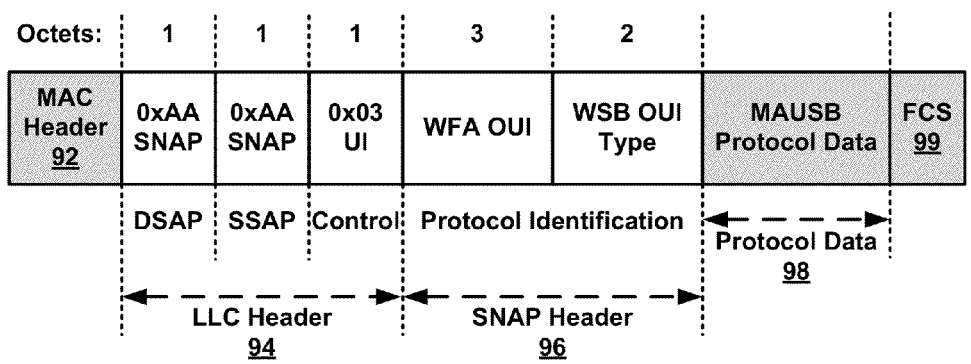
FIG. 6 is a conceptual diagram illustrating an example packet structure that encapsulates a MAUSB protocol for a WSB session deployed directly over the MAC layer.

FIG. 6 is a conceptual diagram illustrating an example packet structure 90 that encapsulates a MAUSB protocol for a WSB service deployed directly over the MAC layer. As described above, the MAUSB protocol for each WSB session of the WSB service may run either over the IP stack or directly over the MAC layer (i.e., raw MAC). Wireless service seeker 12 selects which transport mode the MAUSB protocol should use for a WSB session based on the one or more supported transport modes identified the service information advertised by wireless service advertiser 14 and based on transport mode preferences of wireless service seeker 12 for the WSB session.

When deploying the MAUSB protocol directly over the MAC layer, MAUSB protocol data 98 is encapsulated by a Sub-Network Access Protocol (SNAP) header 96 that identifies the MAUSB protocol for the WSB service. As illustrated in FIG. 6, packet structure 90 includes an IEEE 802.11 MAC header 92, a logical link control (LLC) header 94, SNAP header 96, protocol data 98, and a frame check sequence (FCS) 99. MAC header 92 may include a source MAC address and a destination MAC address of the packet, e.g. the MAC addresses of wireless service seeker 12 and wireless service advertiser 14. Wireless service seeker 12 and wireless service advertiser 14 may transfer packets having packet structure 90 to exchange MAUSB protocol data directly over the MAC layer.

In the example of FIG. 6, LLC header 94 may include a destination service access point (DSAP) field having value 0xAA, a source service access point (SSAP) header having value 0xAA, and an Unnumbered Information (UI) or control field having value 0x03. Each of the three fields included in the LLC header 94 comprises a one-octet sized field value. In addition, SNAP header 96 includes a five-octet sized protocol identification field includes a three-octet sized Organizationally Unique Identifier (OUI) value and a two-octet sized protocol identification OUI Type value that identify the protocol running on top of SNAP. As illustrated in FIG. 6, the OUI value is a Wi-Fi Alliance (WFA) specific OUI value, which may have a hexadecimal value of 0x50-6F-9A. As further illustrated in FIG. 6, the protocol identification OUI Type value is a WSB specific OUI Type value, which may have a hexadecimal value of 0x15-00. The WSB OUI Type value used to identify the MAUSB protocol may be assigned later as part of the WFDS technical specification or another specification.

Packet structure 90 further includes MAUSB protocol data 98, which may include data and other payloads associated with the MAUSB protocol. MAUSB protocol data 98 may be of variable length depending on the message and the contents of the message being sent. FCS 99 comprises a checksum or a frame check sequence based on the content of packet format 90, and allows wireless service seeker 12 and wireless service advertiser 14 to detect if content becomes corrupted during data transmission.

Figure 7:
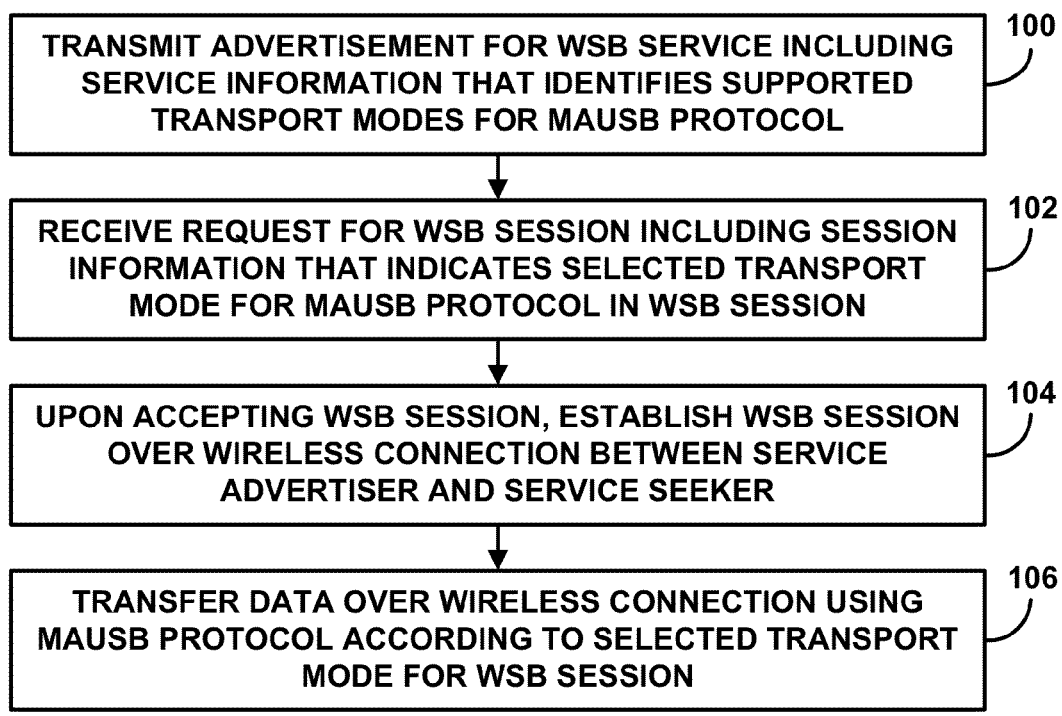
FIG. 7 is a flowchart illustrating an example operation of a wireless service advertiser negotiating a transport mode for a MAUSB protocol in a WSB session.

FIG. 7 is a flowchart illustrating an example operation of a wireless service advertiser negotiating a transport mode for a MAUSB protocol in a WSB session. The example operation of FIG. 7 is described with respect to wireless service advertiser 14 from FIG. 1 having WSB architecture 40 from FIG. 3. In other examples, the operation may be performed by any of WSB peripheral device 24, WSB PAL device 26 or WSB hub device 32 from FIG. 2 operating as a service advertiser.

Wireless service advertiser 14 transmits an advertisement for a WSB service including service information that identifies one or more transport modes for a MAUSB protocol supported by wireless service advertiser 14 (100). The supported transport modes for the MAUSB protocol may include one or both of over the IP stack and directly over the MAC layer. In addition, the service information for the advertised WSB service also identifies one or more USB functionalities offered by the wireless service advertiser 14.

With respect to WSB architecture 40 of wireless service advertiser 14, WSB service component 50 advertises the WSB service to ASP 44. ASP 44 receives service discovery requests from other wireless devices, such as wireless service seeker 12, requesting certain service capabilities. ASP 44 performs a name and service information match between the offered WSB service and the requested service capabilities. Based on a match between the offered WSB service and the requested service capabilities from wireless service seeker 12, ASP 44 generates and sends a service discovery response that includes the service information of the offered WSB service to wireless service seeker 12.

Wireless service advertiser 14 then receives a request from wireless service seeker 12 for a WSB session of the offered WSB service including session information that indicates a selected one of the supported transport modes for the MAUSB protocol in the requested WSB session (102). Upon accepting the requested WSB session, wireless service advertiser 14 and wireless service seeker 12 establish the WSB session of the WSB service over a wireless connection between wireless service advertiser 14 and wireless service seeker 12 (104).

The WSB session setup includes a two-step negotiation to establish a P2P wireless connection between wireless service seeker 12 and wireless service advertiser 14, and establish an ASP session between the ASPs of wireless service seeker 12 and wireless service advertiser 14 over the P2P connection. For example, ASP 44 may receive a provision discovery request from wireless service seeker 12 to establish the P2P wireless connection. The provision discovery request includes the session information indicating the selected one of the supported transport modes for the MAUSB protocol in the requested WSB session. If the application of wireless service advertiser 14 accepts the session information, then wireless service advertiser 14 and wireless service seeker 12 establish the P2P wireless connection. ASP 44 may then receive an ASP session request from wireless service seeker 12 including the session information indicating the selected one of the supported transport modes for the MAUSB protocol in the requested WSB session. The session request is passed to WSB service component 50 to open the ASP session at ASP 44 of wireless service advertiser 14.

WSB service component 50 activates MAUSB component 52 to begin transferring data over the P2P wireless connection using the MAUSB protocol according to the selected one of the supported transport modes for the WSB session (106). WSB service component 50 may also activate data packet processing at ASP 44 based on the selected transport mode for the MAUSB protocol in the WSB session.

Figure 8:
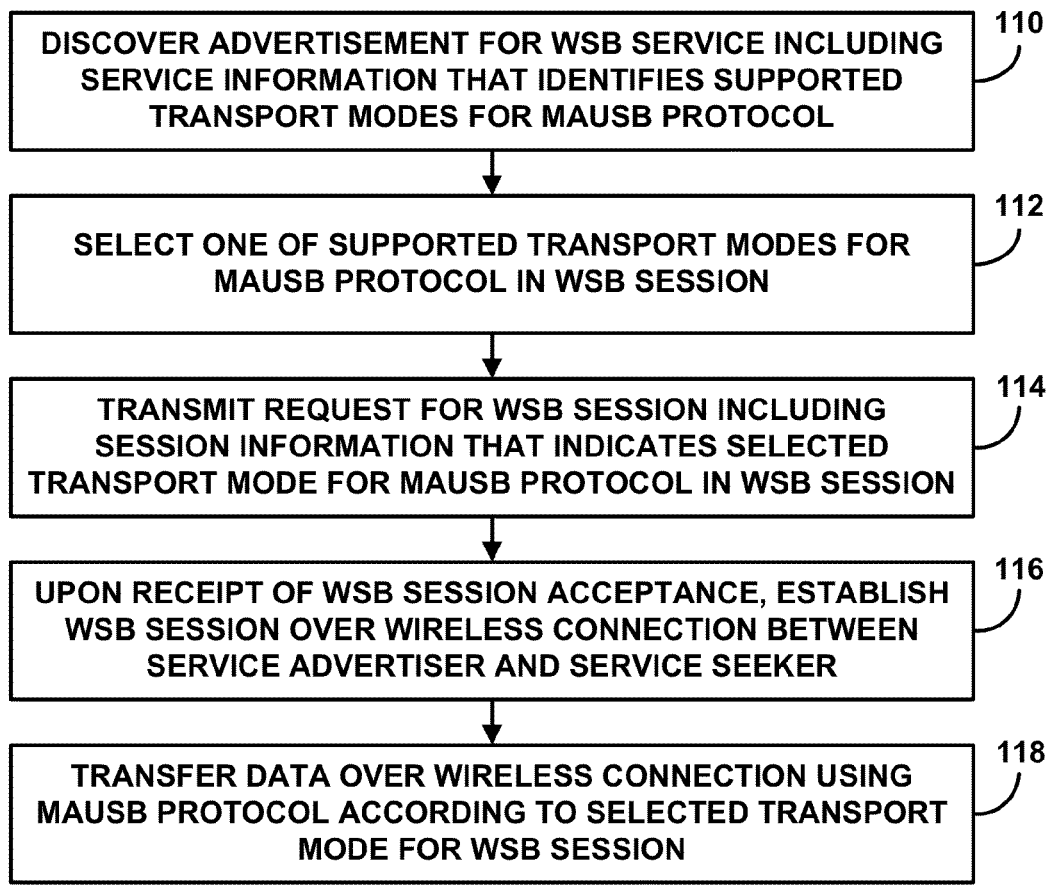
FIG. 8 is a flowchart illustrating an example operation of a wireless service seeker negotiating a transport mode for a MAUSB protocol in a WSB session.

FIG. 8 is a flowchart illustrating an example operation of a wireless service seeker negotiating a transport mode for a MAUSB protocol in a WSB session. The example operation of FIG. 8 is described with respect to wireless service seeker 12 from FIG. 1 having WSB architecture 40 from FIG. 3. In other examples, the operation may be performed by WSB host device 22 from FIG. 2 operating as a service seeker.

Wireless service seeker 12 discovers an advertisement for a WSB service offered by wireless service advertiser 14 including service information that identifies one or more transport modes for a MAUSB protocol supported by wireless service advertiser 14 (110). The supported transport modes for the MAUSB protocol may include one or both of over the IP stack and directly over the MAC layer. In addition, the service information for the discovered WSB service also identifies one or more USB functionalities offered by wireless service advertiser 14.

With respect to WSB architecture 40 of wireless service seeker 12, WSB service component 50 requests ASP 44 to seek for a WSB service having certain service capabilities. ASP 44 generates and sends a service discovery request to other wireless devices, including wireless service advertiser 14, requesting the service capabilities. ASP 44 may receive a service discovery response advertising the WSB service offered by wireless service advertiser 14 that matches the requested service capabilities. The service discovery response from wireless service advertiser 14 includes the service information of the offered WSB service.

Wireless service seeker 12 selects one of the supported transport modes for the MAUSB protocol to be used for a requested WSB session (112). WSB service component 50 of wireless service seeker 12 may select the one of the supported transport modes based on the supported transport modes identified in the service information from wireless service advertiser 14 and transport mode preferences of wireless service seeker 12.

Wireless service seeker 12 then transmits a request for the WSB session of the WSB service offered by wireless service advertiser 14 including session information that indicates the selected one of the supported transport modes for the MAUSB protocol in the requested WSB session (114). Upon receiving acceptance of the WSB session from wireless service advertiser 14, wireless service seeker 12 and wireless service advertiser 14 establish the WSB session of the WSB service over a wireless connection between wireless service seeker 12 and wireless service advertiser 14 (116).

The WSB session setup includes a two-step negotiation to establish a P2P wireless connection between wireless service seeker 12 and wireless service advertiser 14, and establish an ASP session between the ASPs of wireless service seeker 12 and wireless service advertiser 14 over the P2P connection. For example, ASP 44 may send a provision discovery request to wireless service advertiser 14 to establish the P2P wireless connection. The provision discovery request includes the session information indicating the selected one of the supported transport modes for the MAUSB protocol in the requested WSB session. Upon receiving acceptance of the session information from wireless service advertiser 14, wireless service seeker 12 and wireless service advertiser 14 establish the P2P wireless connection. ASP 44 may then send an ASP session request to wireless service advertiser 14 including the session information indicating the selected one of the supported transport modes for the MAUSB protocol in the requested WSB session. Upon receiving confirmation that the ASP session is open at wireless service advertiser 14, the session status is passed to WSB service component 50 to open the ASP session at ASP 44 of wireless service seeker 12.

WSB service component 50 activates MAUSB component 52 to begin transferring data over the P2P wireless connection using the MAUSB protocol according to the selected one of the supported transport modes for the WSB session (118). WSB service component 50 may also activate data packet processing at ASP 44 based on the selected transport mode for the MAUSB protocol in the WSB session.

It should be understood that the steps shown and described above with respect to the example operations illustrated in FIGS. 7 and 8 are provided as merely examples. The steps of the operations of FIGS. 7 and 8 need not necessarily be performed in the order shown in FIGS. 7 and 8, and fewer, additional, or alternative steps may be performed.

Returning to FIG. 4A, the service_name advertised by WSB client device 72 advertises its USB functions using the ([device class code], [device subclass code], [device protocol code], [interface class code], [interface subclass code], [interface protocol code]) tuple. In the case where a USB device may have many interfaces configured, the format does not clarify whether all or a subset are sent, and which subset should be advertised. In addition, for some composite USB devices, their USB functions may not reside in the device/interface descriptor, and instead may reside in the IAD descriptor.

A WSB Service may be identified during the discovery process by its service name. In one example, the service name may have the structure: "org.wi-fi.wsb.[architectural element].[baseclass].[subclass].[protocol]." The rules to set the value of [architectural element] are the following. The "[architectural element]" in the service name of the WSB service provided by WSB host device 62 shall be set to "host." The "[architectural element]" in the service name of the WSB service provided by WSB client device 72 shall be set to "device."

The rules to set the value of [baseclass].[subclass].[protocol].[index] are the following. The [baseclass] contains two hexadecimal digits that represent a USB base class code. The [subclass] contains two hexadecimal digits that represent a byte USB subclass code. The [protocol] contains two hexadecimal digits that represent a byte USB protocol code. The codes in the [baseclass].[subclass].[protocol] tuple indicate the primary function WSB client device 72 intends to advertise as a WSB service. This information can be derived from a USB descriptor of the USB device (e.g., device descriptor, interface descriptor, IAD descriptor, etc.). The information helps WSB host device 62 to identify the device's functionality of interests and its ability to load a device driver based on that functionality [USB_REF]. If the USB device associated with WSB client device 72 has multiple interfaces or multiple configurations that have multiple USB interfaces, WSB client device 72 shall advertise one or multiple WSB Services, each identified by a service name that contains the [baseclass].[subclass].[protocol] tuple of the corresponding interface or IAD descriptor.

WSB host device 62 shall not include ".[baseclass].[subclass].[protocol]" in the service name of its advertised WSB service. WSB client device 72 operating as a WSB hub may advertise at least one WSB service that includes the "[baseclass].[subclass].[protocol]" of the embedded USB hub device. A WSB hub may optionally advertise WSB services for its downstream USB devices by advertising service names that contain "[baseclass].[subclass].[protocol]" of the USB descriptors of its downstream USB devices. WSB client device 72 operating as a WSB Peripheral may advertise at least one WSB Service with a service name that contains "[baseclass].[subclass].[protocol]" of the USB descriptor of its embedded USB device.

For example, a WSB Hub with a full speed USB hub that has a USB mouse device attached downstream shall advertise a WSB service with a service name "org.wi-fi.wsb.device.09.00.00," where "09.00.00" identifies the baseclass, subclass and protocol tuple of a full speed USB hub. It may also advertise a WSB service with a service name "org.wi-fi.wsb.device.03.00.02," where "03.00.02" identifies the baseclass, subclass and protocol tuple of a USB mouse device.

Returning to FIG. 4A, an example of the service_information provided by WSB host device 62 is as follows:

```
<?xml version="1.0" encoding="UTF-8"?>
<xsd:schema xmlns:xsd="http://www.w3.org/2001/XMLSchema"
    targetNamespace="http:// www.wi-fi.org/xmlschema/WfaWsbServiceSchema"
    xmlns:tns="http:// www.wi-fi.org/xmlschema/WfaWsbServiceSchema"
    elementFormDefault="qualified">
    <xsd:element name="wsbServiceInformation" nillable="true">
        <xsd:complexType>
            <xsd:sequence>
                <xsd:element name="wsbClient">
                    <xsd:complexType>
                        <xsd:sequence>
                            <xsd:element name="wsbDeviceType" type="tns:wsbClientTypeName"/>
                            <xsd:element name="wsbDeviceName" type="xsd:string"/>
                            <xsd:element name="usbVersion" type="tns:usbVersionName"/>
                            <xsd:element name="available" type="xsd:boolean"/>
                            <xsd:element name="unavailableReason" type="tns:unavailabilityReasonCode"
nillable="true"/>
                            <xsd:element name="downstreamInfoAvailable" type="xsd:boolean" nillable="true"/>
                            <xsd:element name="isDownstreamInfoComplete" type="xsd:boolean"
nillable="true"/>
                        </xsd:sequence>
                    </xsd:complexType>
                </xsd:element>
                <xsd:element name="usbDevice" maxOccurs="unbounded">
                    <xsd:complexType>
                        <xsd:sequence>
                            <xsd:element name="usbDeviceDescriptor">
                                <xsd:complexType>
                                    <xsd:sequence>
                                        <xsd:element name="usbDeviceClassCode" type="xsd:hexBinary"/>
                                        <xsd:element name="usbDeviceSubclassCode" type="xsd:hexBinary"/>
                                        <xsd:element name="usbDeviceProtocolCode" type="xsd:hexBinary"/>
                                    </xsd:sequence>
                                </xsd:complexType>
                            </xsd:element>
                            <xsd:element name="usbInterfaceDescriptor" maxOccurs="unbounded">
                                <xsd:complexType>
```

```
                <xsd:sequence>
                    <xsd:element name="usbInterfaceClassCode" type="xsd:hexBinary"/>
                    <xsd:element name="usbInterfaceSubclassCode" type="xsd:hexBinary"/>
                    <xsd:element name="usbInterfaceProtocolCode" type="xsd:hexBinary"/>
                </xsd:sequence>
              </xsd:complexType>
            </xsd:element>
          </xsd:sequence>
        </xsd:complexType>
      </xsd:element>
    </xsd:sequence>
  </xsd:complexType>
</xsd:element>
<xsd:element name="wsbSessionInformation" nillable="true">
  <xsd:complexType>
    <xsd:sequence>
      <xsd:element name="PIN" type="xsd:string" nillable="true"/>
    </xsd:sequence>
  </xsd:complexType>
</xsd:element>
<xsd:simpleType name="wsbClientTypeName">
  <xsd:restriction base="xsd:string">
    <xsd:enumeration value="wsbHub"/>
    <xsd:enumeration value="wsbPeripheral"/>
    <xsd:enumeration value="wsbStandaloneClientPal"/>
  </xsd:restriction>
</xsd:simpleType>
<xsd:simpleType name="usbVersionName">
  <xsd:restriction base="xsd:string">
    <xsd:enumeration value="1.0"/>
    <xsd:enumeration value="2.0"/>
    <xsd:enumeration value="3.0"/>
  </xsd:restriction>
</xsd:simpleType>
<xsd:simpleType name="unavailabilityReasonCode">
  <xsd:restriction base="xsd:string">
    <xsd:enumeration value="none"/>
    <xsd:enumeration value="occupied"/>
    <xsd:enumeration value="restricted"/>
  </xsd:restriction>
</xsd:simpleType>
</xsd:schema>
```

An example of the service_information advertised by WSB client device 72 is as follows:

```
<?xml version="1.0" encoding="utf-8"?>
<wsbServiceInformation xmlns="http://www.wi-fi.org/xmlschema/WfaWsbServiceSchema">
 <wsbClient>
  <wsbDeviceType>wsbHub</wsbDeviceType>
  <wsbDeviceName>John's Hub at Home</wsbDeviceName>
  <usbVersion>1.0</usbVersion>
  <available>true</available>
  <downstreamInfoAvailable xmlns:xsi="http://www.w3.org/2001/XMLSchema-instance" xsi:nil="true"
/>
  <isDownstreamInfoComplete xmlns:xsi="http://www.w3.org/2001/XMLSchema-instance"
xsi:nil="true" />
 </wsbClient>
 <usbDevice>
  <usbDeviceDescriptor>
   <usbDeviceClassCode>01</usbDeviceClassCode>
   <usbDeviceSubclassCode>4D</usbDeviceSubclassCode>
   <usbDeviceProtocolCode>53</usbDeviceProtocolCode>
  </usbDeviceDescriptor>
  <usbInterfaceDescriptor>
   <usbInterfaceClassCode>01</usbInterfaceClassCode>
   <usbInterfaceSubclassCode>20</usbInterfaceSubclassCode>
   <usbInterfaceProtocolCode>01</usbInterfaceProtocolCode>
  </usbInterfaceDescriptor>
  <usbInterfaceDescriptor>
   <usbInterfaceClassCode>A4</usbInterfaceClassCode>
   <usbInterfaceSubclassCode>2A</usbInterfaceSubclassCode>
   <usbInterfaceProtocolCode>F3</usbInterfaceProtocolCode>
  </usbInterfaceDescriptor>
  <usbInterfaceDescriptor>
   <usbInterfaceClassCode>C3</usbInterfaceClassCode>
```

```
    <usbInterfaceSubclassCode>DE </usbInterfaceSubclassCode>
    <usbInterfaceProtocolCode>1B</usbInterfaceProtocolCode>
   </usbInterfaceDescriptor>
  </usbDevice>
  <usbDevice>
   <usbDeviceDescriptor>
    <usbDeviceClassCode>12</usbDeviceClassCode>
    <usbDeviceSubclassCode>02</usbDeviceSubclassCode>
    <usbDeviceProtocolCode>C2</usbDeviceProtocolCode>
   </usbDeviceDescriptor>
   <usbInterfaceDescriptor>
    <usbInterfaceClassCode>34</usbInterfaceClassCode>
    <usbInterfaceSubclassCode>2F</usbInterfaceSubclassCode>
    <usbInterfaceProtocolCode>10</usbInterfaceProtocolCode>
   </usbInterfaceDescriptor>
   <usbInterfaceDescriptor>
    <usbInterfaceClassCode>3C</usbInterfaceClassCode>
    <usbInterfaceSubclassCode>1C</usbInterfaceSubclassCode>
    <usbInterfaceProtocolCode>2B</usbInterfaceProtocolCode>
   </usbInterfaceDescriptor>
   <usbInterfaceDescriptor>
    <usbInterfaceClassCode>F2</usbInterfaceClassCode>
    <usbInterfaceSubclassCode>02</usbInterfaceSubclassCode>
    <usbInterfaceProtocolCode>03</usbInterfaceProtocolCode>
   </usbInterfaceDescriptor>
  </usbDevice>
</wsbServiceInformation>
```

In the above examples, the service_information field includes some USB information for pre-association service discovery so that a WSB host device 62 can use this information to assess whether it can support the USB devices on WSB client device 72 before establishing a WSB connection with WSB client device 72. It may be beneficial if the USB information in the service_information field included key information from device descriptors, configuration descriptors, string descriptors, and OS descriptors.

In one example, the format for the service_information field may be shared by both WSB host device 62 and WSB client device 72. The service_information field has two portions. The first portion is a UTF-8 encoded string without null termination in XML format, which contains WSB operation specific information. The second portion is a block of binary data in Type-Length-Value (TLV) format, which contains USB operation specific information.

The XML schema and the use of its elements for the UTF-8 encoded string of the first portion of the service_information field are defined below. The XML data advertised by WSB service component 74 of WSB client device 72 may contain the element "wsbDeviceServiceInformation." The XML data advertised by WSB service component 64 of WSB host device 62 may contain the element "wsbHostServiceInformation."

```
<?xml version="1.0" encoding="UTF-8"?>
<xsd:schema xmlns:xsd="http://www.w3.org/2001/XMLSchema"
    targetNamespace="http://www.wi-fi.org/xmlschema/WfaWsbServiceSchema"
    xmlns:tns="http:// www.wi-fi.org/xmlschema/WfaWsbServiceSchema"
elementFormDefault="qualified">
    <xsd:element name="wsbDeviceServiceInfo" nillable="true">
        <xsd:complexType>
            <xsd:sequence>
                <xsd:element name="friendlyName" type="xsd:string"/>
                <xsd:element name="transport" type=" tns: transportMode" maxOccurs="unbounded"/>
                <xsd:element name="usbVersion" type="tns:usbVersionName"/>
                <xsd:element name="available" type="xsd:boolean"/>
                <xsd:element name="downstreamInfoAvailable" type="xsd:boolean" nillable="true"/>
                <xsd:element name="isDownstreamInfoComplete" type="xsd:boolean" nillable="true"/>
            </xsd:sequence>
        </xsd:complexType>
    </xsd:element>
    <xsd:element name="wsbHostServiceInfo" nillable="true">
        <xsd:complexType>
            <xsd:sequence>
                <xsd:element name="friendlyName" type="xsd:string"/>
                <xsd:element name="transport" type=" tns: transportMode" maxOccurs="unbounded"/>
                <xsd:element name="usbVersion" type="tns:usbVersionName"/>
                <xsd:element name="available" type="xsd:boolean"/>
                <xsd:element name="unavailableReason" type="tns:unavailabilityReasonCode"
nillable="true"/>
            </xsd:sequence>
        </xsd:complexType>
    </xsd:element>
    <xsd:simpleType name="transportMode">
        <xsd:restriction base="xsd:string">
```

```
        <xsd:enumeration value="ip"/>
        <xsd:enumeration value="native"/>
      </xsd:restriction>
    </xsd:simpleType>
    <xsd:simpleType name="usbVersionName">
      <xsd:restriction base="xsd:string">
        <xsd:enumeration value="2.0"/>
        <xsd:enumeration value="3.1"/>
      </xsd:restriction>
    </xsd:simpleType>
  </xsd:schema>
```

The XML element <wsbDeviceServiceInfo> and <wsbHostServiceInfo> has the following fields. The friendlyName field is a text string that gives a user friendly description of the WSB host or client device (e.g., "John's Mass Storage USB Device at Home" or "Amanda's WSB Capable Mobile Phone"). The transport field identifies a transport the WSB host or client device supports. Its format is defined by the XML simple type "transportMode." The usbVersion field identifies the version of USB specification that the WSB host or client device supports. Its format is defined by the XML simple type "usbVersionName." The available field indicates if this WSB service at the WSB host or client device is available.

In addition, the XML element <wsbDeviceServiceInfo> has the following fields, if the WSB client device is a WSB hub. The downstreamInfoAvailable field indicates if the binary portion of the service_information field includes any USB information for downstream USB devices. The is DownstreamInfoComplete field indicates if the binary portion of the service_information field has included the USB information of all downstream USB devices.

The XML Simple Type "transportMode" has the following enumeration values: "ip" indicates the support for the IP transport, and "native" indicates the support for the directly over MAC transport. The XML Simple Type "usbVersionName" has the following enumeration values: "2.0" indicates the support for USB 2.0, and "3.1" indicates the support for USB 3.1.

The following TLV elements are defined for the second portion of the service_information field.

| Elements | Element ID | Note |
| --- | --- | --- |
| USB Information | 0 | A TLV element that contains USB information of embedded USB devices or USB hubs with its downstream USB devices under this device level. There should be only one USB Information TLV element included at one level. |
| USB Device Information | 1 | It contains all USB information of a USB device for pre-association information. |

The binary portion of the service_information field consists of a single USB Information TLV Element. The USB Information TLV element has the following format.

| Field | Size (octets) | Value | Description |
| --- | --- | --- | --- |
| Element ID | 1 | 0 | Identifying the type of TLV element. The specific value is defined in Table X-1. |
| Length | 2 | Variable | Total length of the following fields in bytes. |
| List of USB Device Information TLV Elements | | | A list of USB Device Information TLV elements. |

The USB Device Information TLV Element has the following format:

| Field | Size (octets) | Value | Description |
| --- | --- | --- | --- |
| Element ID | 1 | 1 | Identifying the type of TLV element. The specific value is defined in Table X-1. |
| Length | 2 | | Length of the following fields of the TLV elements in bytes. |
| USB Port | 1 | | The parent hub downstream port number that the device is attached to |
| USB Device Descriptor | 18 | | USB device descriptor for the USB device, as defined by USB-IF. |
| List of USB Configuration Descriptors | variable | | Concatenation of a variable number of USB configuration descriptors for the USB device. The USB configuration descriptor format is defined by USB-IF. |
| List of USB String Descriptors | variable | | Concatenation of a variable number of USB string descriptors for the USB device. The USB string descriptor format is defined by USB-IF. |

Returning to FIGS. 4A and 4B, an example of the session_information provided by WSB host device 62 is as follows:

```
<?xml version="1.0" encoding="utf-8"?>
<wsbSessionInformation xmlns="http://www.wi-fi.org/xmlschema/
WfaWsbServiceSchema">
<PIN>MyPinNumber</PIN>
</wsbSessionInformation>
```

As noted above, while the techniques of this disclosure are generally described with respect to WSB service, it should be understood that the WSB service is only one example of a service that may be established over a Wi-Fi Direct connection consistent with this disclosure. Thus, although the techniques are described in the context of WSB service, other similar services, such as send service, play service, print service, display service, and wireless docking service, may likewise benefit from the techniques of this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for establishing Wireless Serial Bus (WSB) service using a wireless service advertiser device, the method comprising:
    negotiating, by the wireless service advertiser device with a wireless service seeker device, a transport mode for a Media Agnostic Universal Serial Bus (MAUSB) protocol to transfer data over a wireless connection established between the wireless service advertiser device and the wireless service seeker device, wherein negotiating the transport mode for the MAUSB protocol includes:
        transmitting, by the wireless service advertiser device, an advertisement for a WSB service offered by the wireless service advertiser device, wherein the advertisement includes service information that identifies one or more transport modes for the MAUSB protocol that are supported by the wireless service advertiser device, and wherein the supported transport modes include one or more of over an Internet Protocol (IP) stack or directly over a Media Access Control (MAC) layer;
        receiving, by the wireless service advertiser device, a request from the wireless service seeker device for a WSB session of the WSB service offered by the wireless service advertiser device, wherein the request includes session information that indicates a selected one of the supported transport modes for the MAUSB protocol in the WSB session; and
        accepting, by the wireless service advertiser device, the WSB session having the selected one of the supported transport modes for the MAUSB protocol;
    upon accepting the WSB session, establishing, by the wireless service advertiser device, the WSB session of the WSB service over the wireless connection between the wireless service advertiser device and the wireless service seeker device; and
    transferring, by the wireless service advertiser device to the wireless service seeker device, data over the wireless connection using the MAUSB protocol according to the selected one of the supported transport modes for the WSB session.

2. The method of claim 1, wherein receiving the request for the WSB session comprises:
    receiving a provision discovery request from the wireless service seeker device to establish the wireless connection between the wireless service advertiser device and the wireless service seeker device for the WSB session, wherein the provision discovery request includes the session information indicating the selected one of the supported transport modes for the MAUSB protocol in the WSB session; and
    upon accepting the session information, establishing the wireless connection between the wireless service advertiser device and the wireless service seeker device.

3. The method of claim 1, wherein receiving the request for the WSB session comprises receiving an application software platform (ASP) session request from the wireless service seeker device including the session information indicating the selected one of the supported transport modes for the MAUSB protocol in the WSB session.

4. The method of claim 1, wherein transmitting the advertisement for the WSB service offered by the wireless service advertiser device comprises:
    receiving a service discovery request from the wireless service seeker device requesting certain service capabilities; and based on a match between the requested service capabilities and the WSB service offered by the wireless service advertiser device, sending a service discovery response that includes the service information of the WSB service that identifies the supported transport modes for the MAUSB protocol to the wireless service seeker device.

5. The method of claim 1, wherein, based on the selected one of the supported transport modes for the MAUSB protocol being directly over the MAC layer, transferring the data comprises encapsulating the MAUSB protocol data using a Sub-Network Access Protocol (SNAP) header that includes a Wi-Fi Alliance (WFA) specific Organizationally Unique Identifier (OUI) value and a WSB specific OUI Type value.

6. The method of claim 1, wherein, based on the selected one of the supported transport modes for the MAUSB protocol being directly over the MAC layer, establishing the WSB session of the WSB service comprises activating processing of a particular Ethernet type for the MAUSB protocol at an Application Software Platform (ASP) of the wireless service advertiser.

7. The method of claim 1, wherein the service information of the WSB service identifies one or more Universal Serial Bus (USB) functions offered by the wireless service advertiser device, and wherein establishing the WSB session comprises connecting a USB application on the wireless service seeker device to at least one of the USB functions at the wireless service advertiser device over the wireless connection.

8. An apparatus implementing a wireless service advertiser device for establishing Wireless Serial Bus (WSB) service, the apparatus comprising:
a memory configured to store data; and
one or more processors connected to the memory and configured to:
negotiate, by the wireless service advertiser device with a wireless service seeker device, a transport mode for a Media Agnostic Universal Serial Bus (MAUSB) protocol to transfer data over a wireless connection established between the wireless service advertiser device and the wireless service seeker device, wherein, to negotiate the transport mode for the MAUSB protocol, the one or more processors are configured to:
transmit an advertisement for a WSB service offered by the wireless service advertiser device, wherein the advertisement includes service information that identifies one or more transport modes for the MAUSB protocol that are supported by the wireless service advertiser, and wherein the supported transport modes include one or more of over an Internet Protocol (IP) stack or directly over a Media Access Control (MAC) layer;
receive a request from the wireless service seeker device for a WSB session of the WSB service offered by the wireless service advertiser device, wherein the request includes session information that indicates a selected one of the supported transport modes for the MAUSB protocol in the WSB session; and
accept the WSB session having the selected one of the supported transport modes for the MAUSB protocol;
upon accepting the WSB session, establish the WSB session of the WSB service over the wireless connection between the wireless service advertiser device and the wireless service seeker device; and
transfer data over the wireless connection using the MAUSB protocol according to the selected one of the supported transport modes for the WSB session.

9. The apparatus of claim 8, wherein the one or more processors are configured to:
receive a provision discovery request from the wireless service seeker device to establish the wireless connection between the wireless service advertiser device and the wireless service seeker device for the WSB session, wherein the provision discovery request includes the session information indicating the selected one of the supported transport modes for the MAUSB protocol in the WSB session; and
upon accepting the session information, establish the wireless connection between the wireless service advertiser device and the wireless service seeker device.

10. The apparatus of claim 8, wherein the one or more processors are configured to receive an application software platform (ASP) session request from the wireless service seeker device including the session information indicating the selected one of the supported transport modes for the MAUSB protocol in the WSB session.

11. The apparatus of claim 8, wherein, to transmit the advertisement for the WSB service, the one or more processors are configured to:
receive a service discovery request from the wireless service seeker device requesting certain service capabilities; and
based on a match between the requested service capabilities and the WSB service offered by the wireless service advertiser device, send a service discovery response that includes the service information of the WSB service that identifies the supported transport modes for the MAUSB protocol to the wireless service seeker device.

12. The apparatus of claim 8, wherein, based on the selected one of the supported transport modes for the MAUSB protocol being directly over the MAC layer, the one or more processors are configured to encapsulate the MAUSB protocol data using a Sub-Network Access Protocol (SNAP) header that includes a Wi-Fi Alliance (WFA) specific Organizationally Unique Identifier (OUI) value and a WSB specific OUI Type value.

13. The apparatus of claim 8, wherein, based on the selected one of the supported transport modes for the MAUSB protocol being directly over the MAC layer, the one or more processors are configured to activate processing of a particular Ethernet type for the MAUSB protocol at an Application Software Platform (ASP) of the wireless service advertiser.

14. The apparatus of claim 8, wherein the service information of the WSB service identifies one or more Universal Serial Bus (USB) functions offered by the wireless service advertiser device, and wherein, upon establishment of the WSB session, the one or more processors are configured to connect a USB application on the wireless service seeker device to at least one of the USB functions at the wireless service advertiser device over the wireless connection.

15. An apparatus implementing a wireless service advertiser device for establishing Wireless Serial Bus (WSB) service, the apparatus comprising:
means for negotiating, by the wireless service advertiser device with a wireless service seeker device, a transport mode for a Media Agnostic Universal Serial Bus (MAUSB) protocol to transfer data over a wireless connection established between the wireless service advertiser device and the wireless service seeker device, wherein the means for negotiating the transport mode for the MAUSB protocol include:
  means for transmitting an advertisement for a WSB service offered by the wireless service advertiser device, wherein the advertisement includes service information that identifies one or more transport modes for the MAUSB protocol that are supported by the wireless service advertiser device, and wherein the supported transport modes include one or more of over an Internet Protocol (IP) stack or directly over a Media Access Control (MAC) layer;
  means for receiving a request from the wireless service seeker device for a WSB session of the WSB service offered by the wireless service advertiser device, wherein the request includes session information that indicates a selected one of the supported transport modes for the MAUSB protocol in the WSB session; and
  means for accepting the WSB session having the selected one of the supported transport modes for the MAUSB protocol;
upon accepting the WSB session, means for establishing the WSB session of the WSB service over the wireless connection between the wireless service advertiser device and the wireless service seeker device; and
means for transferring data over the wireless connection using the MAUSB protocol according to the selected one of the supported transport modes for the WSB session.

16. The apparatus of claim 15, wherein the means for receiving the WSB session request further comprise:
  means for receiving a provision discovery request from the wireless service seeker device to establish the wireless connection between the wireless service advertiser device and the wireless service seeker device for the WSB session, wherein the provision discovery request includes the session information indicating the selected one of the supported transport modes for the MAUSB protocol in the WSB session; and
  upon accepting the session information, means for establishing the wireless connection between the wireless service advertiser device and the wireless service seeker device.

17. The apparatus of claim 15, wherein the means for receiving the WSB session request comprise means for receiving an application software platform (ASP) session request from the wireless service seeker device including the session information indicating the selected one of the supported transport modes for the MAUSB protocol in the WSB session.

18. A non-transitory computer-readable medium storing instructions for establishing Wireless Serial Bus (WSB) service that when executed cause one or more processors to:
  negotiate, by a wireless service advertiser device with a wireless service seeker device, a transport mode for a Media Agnostic Universal Serial Bus (MAUSB) protocol to transfer data over a wireless connection established between the wireless service advertiser device and the wireless service seeker device, wherein, to negotiate the transport mode for the MAUSB protocol, the instructions cause the one or more processors to:
    transmit, by the wireless service advertiser device, an advertisement for a WSB service offered by the wireless service advertiser device, wherein the advertisement includes service information that identifies one or more transport modes for the MAUSB protocol that are supported by the wireless service advertiser device, and wherein the supported transport modes include one or more of over an Internet Protocol (IP) stack or directly over a Media Access Control (MAC) layer;
    receive, by the wireless service advertiser device, a request from the wireless service seeker device for a WSB session of the WSB service offered by the wireless service advertiser device, wherein the request includes session information that indicates a selected one of the supported transport modes for the MAUSB protocol in the WSB session; and
    accept, by the wireless service advertiser device, the WSB session having the selected one of the supported transport modes for the MAUSB protocol;
  upon accepting the WSB session, establish, by the wireless service advertiser device, the WSB session of the WSB service over the wireless connection between the wireless service advertiser device and the wireless service seeker device; and
  transfer, by the wireless service advertiser device to the wireless service seeker device, data over the wireless connection using the MAUSB protocol according to the selected one of the supported transport modes for the WSB session.

19. A method for establishing Wireless Serial Bus (WSB) service using a wireless service seeker device, the method comprising:
  negotiating, by the wireless service seeker device with a wireless service advertiser device, a transport mode for a Media Agnostic Universal Serial Bus (MAUSB) protocol to transfer data over a wireless connection established between the wireless service seeker device and the wireless service advertiser device, wherein negotiating the transport mode for the MAUSB protocol includes:
    discovering, by the wireless service seeker device, an advertisement for a WSB service offered by the wireless service advertiser device, wherein the advertisement includes service information that identifies one or more transport modes for the MAUSB protocol that are supported by the wireless service advertiser device, and wherein the supported transport modes include one or more of over an Internet Protocol (IP) stack or directly over a Media Access Control (MAC) layer;
    transmitting, by the wireless service seeker device, a request for a WSB session of the WSB service offered by the wireless service advertiser device, wherein the request includes session information that indicates a selected one of the supported transport modes for the MAUSB protocol in the WSB session; and
    receiving, by the wireless service seeker device from the wireless service advertiser device, an acceptance of the WSB session having the selected one of the supported transport modes for the MAUSB protocol;
  upon receiving the acceptance of the WSB session from the wireless service advertiser device, establishing, by the wireless service seeker device, the WSB session of the WSB service over the wireless connection between the wireless service seeker device and the wireless service advertiser device; and
  transferring ,by the wireless service seeker device to the wireless service advertiser device, data over the wireless connection using the MAUSB protocol according to the selected one of the supported transport modes for the WSB session.

20. The method of claim 19, further comprising selecting the selected one of the supported transport modes for the MAUSB protocol in the WSB session based on the supported transport modes identified in the service information from the wireless service advertiser device and transport mode preferences of the wireless service seeker device for the WSB session.

21. The method of claim 19, wherein transmitting the request for the WSB session comprises:
sending a provision discovery request to the wireless service advertiser device to establish the wireless connection between the wireless service seeker device and the wireless service advertiser device for the WSB session, wherein the provision discovery request includes the session information indicating the selected one of the supported transport modes for the MAUSB protocol in the WSB session; and
upon receiving acceptance of the session information from the wireless service advertiser device, establishing the wireless connection between the wireless service seeker device and the wireless service advertiser device.

22. The method of claim 19, wherein transmitting the request for the WSB session comprises sending an application software platform (ASP) session request to the wireless service advertiser device including the session information indicating the selected one of the supported transport modes for the MAUSB protocol in the WSB session.

23. The method of claim 19, wherein discovering the advertisement for the WSB service offered by the wireless service advertiser device comprises:
sending a service discovery request to the wireless service advertiser device requesting certain service capabilities; and
receiving a service discovery response advertising the WSB service offered by the wireless service advertiser device that matches the requested service capabilities, wherein the service discovery response includes the service information of the WSB service that identifies the supported transport modes for the MAUSB protocol.

24. The method of claim 19, wherein, based on the selected one of the supported transport modes for the MAUSB protocol being directly over the MAC layer, transferring the data comprises encapsulating the MAUSB protocol data using a Sub-Network Access Protocol (SNAP) header that includes a Wi-Fi Alliance (WFA) specific Organizationally Unique Identifier (OUI) value and a WSB specific OUI Type value.

25. The method of claim 19, wherein, based on the selected one of the supported transport modes for the MAUSB protocol being directly over the MAC layer, establishing the WSB session of the WSB service comprises activating processing of a particular Ethernet type for the MAUSB protocol at an Application Software Platform (ASP) of the wireless service seeker.

26. The method of claim 19, wherein the service information of the WSB service identifies one or more Universal Serial Bus (USB) functions offered by the wireless service advertiser device, and wherein establishing the WSB session comprises connecting a USB application on the wireless service seeker device to at least one of the USB functions at the wireless service advertiser device over the wireless connection.

27. An apparatus implementing a wireless service seeker device for establishing Wireless Serial Bus (WSB) service, the apparatus comprising:
a memory configured to store data; and
one or more processors connected to the memory and configured to:
negotiate, by the wireless service seeker device with a wireless service advertiser device, a transport mode for a Media Agnostic Universal Serial Bus (MAUSB) protocol to transfer data over a wireless connection established by the WSB service between the wireless service seeker device and the wireless service advertiser device, wherein, to negotiate the transport mode for the MAUSB protocol, the one or more processors are configured to:
discover an advertisement for a WSB service offered by the wireless service advertiser device, wherein the advertisement includes service information that identifies one or more transport modes for the MAUSB protocol that are supported by the wireless service advertiser device, and wherein the supported transport modes include one or more of over an Internet Protocol (IP) stack or directly over a Media Access Control (MAC) layer;
transmit a request to the wireless service advertiser device for a WSB session of the WSB service offered by the wireless service advertiser device, wherein the request includes session information that indicates a selected one of the supported transport modes for the MAUSB protocol in the WSB session; and
receive, from the wireless service advertiser device, an acceptance of the WSB session having the selected one of the supported transport modes for the MAUSB protocol;
upon receiving the acceptance of the WSB session from the wireless service advertiser device, establish the WSB session of the WSB service over the wireless connection between the wireless service seeker device and the wireless service advertiser device; and
transfer data over the wireless connection using the MAUSB protocol according to the selected one of the supported transport modes for the WSB session.

28. The apparatus of claim 27, wherein the one or more processors are configured to select the selected one of the supported transport modes for the MAUSB protocol in the WSB session based on the supported transport modes identified in the service information from the wireless service advertiser device and transport mode preferences at the wireless service seeker device.

29. The apparatus of claim 27, wherein, to transmit the request for the WSB session, the one or more processors are configured to:
send a provision discovery request to the wireless service advertiser device to establish the wireless connection between the wireless service seeker device and the wireless service advertiser device for the WSB session, wherein the provision discovery request includes the session information indicating the selected one of the supported transport modes for the MAUSB protocol in the WSB session; and
upon receiving acceptance of the session information from the wireless service advertiser device, establish the wireless connection between the wireless service seeker device and the wireless service advertiser device.

30. The apparatus of claim 27, wherein, to transmit the request for the WSB session, the one or more processors are configured to send an application software platform (ASP) session request to the wireless service advertiser device including the session information indicating the selected one of the supported transport modes for the MAUSB protocol in the WSB session.

31. The apparatus of claim 27, wherein, to discover the advertisement for the WSB service offered by the wireless service advertiser device, the one or more processors are configured to:

send a service discovery request to the wireless service advertiser device requesting certain service capabilities; and receive a service discovery response advertising the WSB service offered by the wireless service advertiser device that matches the requested service capabilities, wherein the service discovery response includes the service information of the WSB service that identifies the supported transport modes for the MAUSB protocol.

32. The apparatus of claim 27, wherein, based on the selected one of the supported transport modes for the MAUSB protocol being directly over the MAC layer, the one or more processors are configured to encapsulate the MAUSB protocol data using a Sub-Network Access Protocol (SNAP) header that includes a Wi-Fi Alliance (WFA) specific Organizationally Unique Identifier (OUI) value and a WSB specific OUI Type value.

33. The apparatus of claim 27, wherein, based on the selected one of the supported transport modes for the MAUSB protocol being directly over the MAC layer, the one or more processors are configured to activate processing of a particular Ethernet type for the MAUSB protocol at an Application Software Platform (ASP) of the wireless service seeker.

34. The apparatus of claim 27, wherein the service information of the WSB service identifies one or more Universal Serial Bus (USB) functions offered by the wireless service advertiser device, and wherein, upon establishment of the WSB session, the one or more processors are configured to connect a USB application on the wireless service seeker device to at least one of the USB functions at the wireless service advertiser device over the wireless connection.

\* \* \* \* \*